(12) United States Patent
Matsunaga et al.

(10) Patent No.: US 12,654,726 B2
(45) Date of Patent: Jun. 16, 2026

(54) VEHICLE DRIVING ASSIST APPARATUS

(71) Applicant: TOYOTA JIDOSHA KABUSHIKI KAISHA, Toyota (JP)

(72) Inventors: Masaki Matsunaga, Odawara (JP); Atsuko Yamada, Toyota (JP); Kohsuke Fujii, Toyota (JP); Hideki Kamatani, Nagoya (JP); Yuzuru Kamogari, Toyota (JP); Soichi Okubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 17/011,603

(22) Filed: Sep. 3, 2020

(65) Prior Publication Data

US 2021/0070314 A1 Mar. 11, 2021

(30) Foreign Application Priority Data

Sep. 9, 2019 (JP) ................................. 2019-163563

(51) Int. Cl.
*B60W 50/08* (2020.01)
*B60W 60/00* (2020.01)

(52) U.S. Cl.
CPC ........ *B60W 50/082* (2013.01); *B60W 50/085* (2013.01); *B60W 60/005* (2020.02); *B60W 2720/106* (2013.01)

(58) Field of Classification Search
None
See application file for complete search history.

(56) References Cited

U.S. PATENT DOCUMENTS

| | | | |
|---|---|---|---|
| 9,452,780 B2 * | 9/2016 | Schumacher | ......... B60W 50/10 |
| 2002/0007239 A1 * | 1/2002 | Matsumoto | ........ B60K 23/0808 |
| | | | 701/41 |
| 2005/0131614 A1 | 6/2005 | Isogai et al. | |

(Continued)

FOREIGN PATENT DOCUMENTS

| | | |
|---|---|---|
| JP | 2005-193886 A | 7/2005 |
| JP | 2012-131466 A | 7/2012 |
| JP | 2017-207859 A | 11/2017 |

*Primary Examiner* — Fadey S. Jabr
*Assistant Examiner* — Mario C Gonzalez
(74) *Attorney, Agent, or Firm* — Sughrue Mion, PLLC

(57) ABSTRACT

The vehicle driving assist apparatus can execute at least one of an acceleration/deceleration control as a driving assist control to automatically accelerate and decelerate an own vehicle and a steering control as the driving assist control to automatically steer the own vehicle. The vehicle driving assist apparatus includes a driving assist restart switch operated by a driver of the own vehicle to restart the driving assist control. The vehicle driving assist apparatus does not restart the acceleration/deceleration control even when the driving assist restart switch is operated after stopping the acceleration/deceleration control in response to the driver performing an automatic acceleration/deceleration rejection operation. The vehicle driving assist apparatus does not restart the steering control even when the driving assist restart switch is operated after stopping the steering control in response to the driver performing an automatic steering rejection operation.

9 Claims, 9 Drawing Sheets

(56) References Cited

U.S. PATENT DOCUMENTS

| | | | |
|---|---|---|---|
| 2016/0009283 A1* | 1/2016 | Tokimasa .............. | B60W 30/14 |
| | | | 701/96 |
| 2016/0272202 A1* | 9/2016 | Inomata ................ | B60W 30/12 |
| 2017/0334451 A1 | 11/2017 | Asakura et al. | |
| 2019/0204828 A1* | 7/2019 | Ishikawa .............. | G05D 1/0223 |
| 2020/0353919 A1* | 11/2020 | Kawabata ............... | G01S 15/93 |
| 2022/0219692 A1* | 7/2022 | Taniguchi ............. | B60W 30/12 |

* cited by examiner

VEHICLE DRIVING ASSIST APPARATUS

BACKGROUND

Field

The invention relates to a vehicle driving assist apparatus.

Description of the Related Art

A vehicle driving assist apparatus which executes various driving assist controls is described in JP 2012-131466 A. JP 2012-131466 A describes the driving assist controls such as a lane keeping control, an inter-vehicle distance control, a moving speed control, and a constant moving speed control. The lane keeping control is a control to automatically steer an own vehicle to cause the own vehicle to move in a traffic lane. The inter-vehicle distance control is a control to automatically accelerate and decelerate the own vehicle to maintain an inter-vehicle distance at a predetermined distance. The inter-vehicle distance is a distance between the own vehicle and another vehicle moving just ahead of the own vehicle. The moving speed control is a control automatically accelerate and decelerate the own vehicle to maintain a moving speed of the own vehicle at a predetermine moving speed or less. The constant moving speed control is a control to automatically accelerate and decelerate the own vehicle to maintain the moving speed of the own vehicle at a predetermined moving speed.

The vehicle driving assist apparatus is known which comprising a driving assist restart switch operated by a driver of the own vehicle to request to restart the driving assist control. If the known vehicle driving assist apparatus is configured to restart the driving assist control which has been stopped when the driver operates the driving assist restart switch without considering an intention of the driver as to which driving assist control the driver desires to execute, the driving assist control which the driver does not desire to execute, may be executed.

SUMMARY

The invention has been made for solving problems described above. An object of the invention is to provide a vehicle driving assist apparatus which can execute the driving assist control which the driver desires to execute when the driver operates the driving assist restart switch.

A vehicle driving assist apparatus according to the invention is applied to a vehicle as an own vehicle. The vehicle driving assist apparatus comprises an electronic control unit and a driving assist restart switch.

The electronic control unit can execute at least one of (i) an acceleration/deceleration control as a driving assist control to automatically accelerate and decelerate an own vehicle and (ii) a steering control as the driving assist control to automatically steer the own vehicle.

The driving assist restart switch is operated by a driver of the own vehicle to restart to execute the driving assist control which the electronic control unit has stopped executing.

The electronic control unit is configured to stop executing the acceleration/deceleration control in response to the driver performing an automatic acceleration/deceleration rejection operation as the electronic control unit executes the acceleration/deceleration control, the automatic acceleration/deceleration rejection operation being an operation indicating that the driver does not desire to execute the acceleration/deceleration control.

The electronic control unit is further configured to stop executing the steering control in response to the driver performing an automatic steering rejection operation as the electronic control unit executes the steering control, the automatic steering rejection operation being an operation indicating that the driver does not desire to execute the steering control.

The electronic control unit is further configured to stop executing the acceleration/deceleration control in response to the driver performing an automatic acceleration/deceleration stop operation other than the automatic acceleration/deceleration rejection operation as the electronic control unit executes the acceleration/deceleration control.

The electronic control unit is further configured to stop executing the steering control in response to the driver performing an automatic steering stop operation other than the automatic steering rejection operation as the electronic control unit executes the steering control.

The electronic control unit is further configured not to restart to execute the acceleration/deceleration control when the driving assist restart switch is operated after the electronic control unit stopped executing the acceleration/deceleration control in response to the driver performing the automatic acceleration/deceleration rejection operation.

The electronic control unit is further configured not to restart to execute the steering control when the driving assist restart switch (83) is operated after the electronic control unit stopped executing the steering control in response to the driver performing the automatic steering rejection operation.

The electronic control unit is further configured to restart to execute the acceleration/deceleration control when the driving assist restart switch is operated after the electronic control unit stopped executing the acceleration/deceleration control in response to the driver performing the automatic acceleration/deceleration stop operation.

The electronic control unit is further configured to restart to execute the steering control when the driving assist restart switch is operated after the electronic control unit stopped executing the steering control in response to the driver performing the automatic steering stop operation.

When the driver performs the automatic acceleration/deceleration rejection operation as the acceleration/deceleration control is executed, the driver presumably has an intention not to desire an automatic acceleration and deceleration of the own vehicle. When the driver presumably has the intention not to desire the automatic acceleration and deceleration of the own vehicle, the acceleration/deceleration control should not be executed in response to the driver operating the driving assist restart switch after the acceleration/deceleration control was stopped in consideration of the intention of the driver.

The vehicle driving assist apparatus according to the invention determines that the driver has an intention not to desire the automatic acceleration and deceleration of the own vehicle when the vehicle driving assist apparatus stops executing the acceleration/deceleration control in response to the driver performing the automatic acceleration/deceleration rejection operation as the vehicle driving assist apparatus executes the acceleration/deceleration control. In this case, the vehicle driving assist apparatus does not restart to execute the acceleration/deceleration control even when the driving assist restart switch is operated. Thus, the driving assist control can be executed in accordance with the intention of the driver.

Similarly, when the driver performs the automatic steering rejection operation as the steering control is executed, the driver presumably has an intention not to desire an automatic steering of the own vehicle. When the driver presumably has the intention not to desire the automatic steering of the own vehicle, the steering control should not be executed in response to the driver operating the driving assist restart switch after the steering control was stopped in consideration of the intention of the driver.

The vehicle driving assist apparatus according to the invention determines that the driver has an intention not to desire the automatic steering of the own vehicle when the vehicle driving assist apparatus stops executing the steering control in response to the driver performing the automatic steering rejection operation as the vehicle driving assist apparatus executes the steering control. In this case, the vehicle driving assist apparatus does not restart to execute the steering control even when the driving assist restart switch is operated. Thus, the driving assist control can be executed in accordance with the intention of the driver.

According to an aspect of the invention, the vehicle driving assist apparatus may further comprise an acceleration/deceleration assist switch operated by the driver to execute and stop executing only the acceleration/deceleration control. In this case, the automatic acceleration/deceleration rejection operation may be an operation performed by the driver to the acceleration/deceleration assist switch as the electronic control unit executes the acceleration/deceleration control.

When the driver operates the acceleration/deceleration assist switch as the acceleration/deceleration control is executed, the driver presumably has an intention not to desire the automatic acceleration and deceleration of the own vehicle. The vehicle driving assist apparatus according to this aspect of the invention determines that the driver has an intention not to desire the automatic acceleration and deceleration of the own vehicle when the vehicle driving assist apparatus stops executing the acceleration/deceleration control in response to the driver operating the acceleration/deceleration assist switch as the vehicle driving assist apparatus executes the acceleration/deceleration control. In this case, the vehicle driving assist apparatus does not restart to execute the acceleration/deceleration control even when the driving assist restart switch is operated. Thus, the driving assist control can be executed in accordance with the intention of the driver.

According to another aspect of the invention, the vehicle driving assist apparatus may further comprise a steering assist switch operated by the driver to execute and stop executing only the steering control. In this case, the steering rejection operation may be an operation performed by the driver to the steering assist switch as the electronic control unit executes the steering control.

When the driver operates the steering assist switch as the steering control is executed, the driver presumably has an intention not to desire the automatic steering of the own vehicle. The vehicle driving assist apparatus according to this aspect of the invention determines that the driver has an intention not to desire the automatic steering of the own vehicle when the vehicle driving assist apparatus stops executing the steering control in response to the driver operating the steering assist switch as the vehicle driving assist apparatus executes the steering control. In this case, the vehicle driving assist apparatus does not restart to execute the steering control even when the driving assist restart switch is operated. Thus, the driving assist control can be executed in accordance with the intention of the driver.

According to further another aspect of the invention, the own vehicle may be provided with an acceleration operator operated by the driver to accelerate the own vehicle. In this case, the automatic acceleration/deceleration rejection operation may be an operation performed by the driver to the acceleration operator as the electronic control unit executes the acceleration/deceleration control.

When the driver operates the acceleration operator as the acceleration/deceleration control is executed, the driver presumably has an intention not to desire the automatic acceleration and deceleration of the own vehicle. The vehicle driving assist apparatus according to this aspect of the invention determines that the driver has an intention not to desire the automatic acceleration and deceleration of the own vehicle when the vehicle driving assist apparatus stops executing the acceleration/deceleration control in response to the driver operating the acceleration operator as the vehicle driving assist apparatus executes the acceleration/deceleration control. In this case, the vehicle driving assist apparatus does not restart to execute the acceleration/deceleration control even when the driving assist restart switch is operated. Thus, the driving assist control can be executed in accordance with the intention of the driver.

According to further another aspect of the invention, the own vehicle may be provided with a brake operator operated by the driver to brake the own vehicle. In this case, the automatic acceleration/deceleration rejection operation may be an operation performed by the driver to the brake operator as the electronic control unit executes the acceleration/deceleration control.

When the driver operates the brake operator as the acceleration/deceleration control is executed, the driver presumably has an intention not to desire the automatic acceleration and deceleration of the own vehicle. The vehicle driving assist apparatus according to this aspect of the invention determines that the driver has an intention not to desire the automatic acceleration and deceleration of the own vehicle when the vehicle driving assist apparatus stops executing the acceleration/deceleration control in response to the driver operating the brake operator as the vehicle driving assist apparatus executes the acceleration/deceleration control. In this case, the vehicle driving assist apparatus does not restart to execute the acceleration/deceleration control even when the driving assist restart switch is operated. Thus, the driving assist control can be executed in accordance with the intention of the driver.

According to further another aspect of the invention, the own vehicle may be provided with a steering operator operated by the driver to steer the own vehicle. In this case, the automatic steering rejection operation may be an operation performed by the driver to the steering operator as the electronic control unit executes the steering control.

When the driver operates the steering operator as the steering control is executed, the driver presumably has an intention not to desire the automatic steering of the own vehicle. The vehicle driving assist apparatus according to this aspect of the invention determines that the driver has an intention not to desire the automatic steering of the own vehicle when the vehicle driving assist apparatus stops executing the steering control in response to the driver operating the steering operator as the vehicle driving assist apparatus executes the steering control. In this case, the vehicle driving assist apparatus does not restart to execute the steering control even when the driving assist restart switch is operated. Thus, the driving assist control can be executed in accordance with the intention of the driver.

According to further another aspect of the invention, the vehicle driving assist apparatus may further comprise a driving assist switch operated by the driver to execute and stop executing the driving assist control. In this case, the automatic acceleration/deceleration stop operation may be an operation performed by the driver to the driving assist switch as the electronic control unit executes the acceleration/deceleration control.

When the driver operates the driving assist switch as the acceleration/deceleration control is executed, the driver does not always have an intention not to desire the automatic acceleration/deceleration of the own vehicle. The vehicle driving assist apparatus according to this aspect of the invention determines that the driver may have an intention to desire the automatic acceleration/deceleration of the own vehicle when the vehicle driving assist apparatus stops executing the acceleration/deceleration control in response to the driver operating the driving assist switch as the vehicle driving assist apparatus executes the acceleration/deceleration control. In this case, the vehicle driving assist apparatus restarts to execute the acceleration/deceleration control when the driving assist restart switch is operated. Thus, the driving assist control can be executed in accordance with the intention of the driver.

According to further another aspect of the invention, the vehicle driving assist apparatus may further comprise a driving assist switch operated by the driver to execute and stop executing the driving assist control. In this case, the automatic steering stop operation may be an operation performed by the driver to the driving assist switch as the electronic control unit executes the steering control.

When the driver operates the driving assist switch as the steering control is executed, the driver does not always have an intention not to desire the automatic steering of the own vehicle. The vehicle driving assist apparatus according to this aspect of the invention determines that the driver may have an intention to desire the automatic steering of the own vehicle when the vehicle driving assist apparatus stops executing the steering control in response to the driver operating the driving assist switch as the vehicle driving assist apparatus executes the steering control. In this case, the vehicle driving assist apparatus restarts to execute the steering control when the driving assist restart switch is operated. Thus, the driving assist control can be executed in accordance with the intention of the driver.

According to further another aspect of the invention, the vehicle driving assist apparatus may further comprise a cancelling switch operated by the driver to stop executing the driving assist control. In this case, the automatic acceleration/deceleration stop operation may be an operation performed by the driver to the cancelling switch as the electronic control unit executes the acceleration/deceleration control.

When the driver operates the cancelling switch as the driving assist control is executed, the driver does not always have an intention not to desire the automatic acceleration and deceleration of the own vehicle. In the vehicle driving assist apparatus according to this aspect of the invention, the automatic acceleration/deceleration stop operation is the operation performed by the driver to the cancelling switch as the acceleration/deceleration control is executed. Therefore, the vehicle driving assist apparatus according to this aspect of the invention determines that the driver may have an intention to desire the automatic acceleration and deceleration of the own vehicle when the vehicle driving assist apparatus stops executing the acceleration/deceleration control in response to the driver operating the cancelling switch as the vehicle driving assist apparatus executes the acceleration/deceleration control as the driving assist control. In this case, the vehicle driving assist apparatus restarts to execute the acceleration/deceleration control when the driving assist restart switch is operated. Thus, the driving assist control can be executed in accordance with the intention of the driver.

According to further another aspect of the invention, the vehicle driving assist apparatus may further comprise a cancelling switch operated by the driver to stop executing the driving assist control. In this case, the automatic steering stop operation may be an operation performed by the driver to the cancelling switch (84) as the electronic control unit executes the steering control.

When the driver operates the cancelling switch as the driving assist control is executed, the driver does not always have an intention not to desire the automatic steering of the own vehicle. In the vehicle driving assist apparatus according to this aspect of the invention, the automatic steering stop operation is the operation performed by the driver to the cancelling switch as the steering control is executed. Therefore, the vehicle driving assist apparatus according to this aspect of the invention determines that the driver may have an intention to desire the automatic steering of the own vehicle when the vehicle driving assist apparatus stops executing the steering control in response to the driver operating the cancelling switch as the vehicle driving assist apparatus executes the steering control as the driving assist control. In this case, the vehicle driving assist apparatus restarts to execute the steering control when the driving assist restart switch is operated. Thus, the driving assist control can be executed in accordance with the intention of the driver.

According to further another aspect of the invention, the electronic control unit may be further configured to execute both the acceleration/deceleration control and the steering control as the driving assist control.

In this case, the electronic control unit may be further configured to stop executing both the acceleration/deceleration control and the steering control in response to the driver performing the automatic acceleration/deceleration rejection operation as the electronic control unit executes both the acceleration/deceleration control and the steering control.

In this case, the electronic control unit may be further configured to stop executing both the acceleration/deceleration control and the steering control in response to the driver performing the automatic steering rejection operation as the electronic control unit executes both the acceleration/deceleration control and the steering control.

In this case, the electronic control unit may be further configured to restart to execute the steering control without restarting to execute the acceleration/deceleration control when the driving assist restart switch is operated after the electronic control unit stopped executing both the acceleration/deceleration control and the steering control in response to the driver performing the automatic acceleration/deceleration rejection operation.

In this case, the electronic control unit may be further configured to restart to execute the acceleration/deceleration control without restarting to execute the steering control when the driving assist restart switch is operated after the electronic control unit stopped executing both the acceleration/deceleration control and the steering control in response to the driver performing the automatic steering rejection operation.

When the driver performs the automatic acceleration/deceleration rejection operation as both the acceleration/ deceleration control and the steering control are executed, the driver presumably has an intention not to desire the automatic acceleration and deceleration of the own vehicle. The vehicle driving assist apparatus according to this aspect of the invention determines that the driver has an intention not to desire the automatic acceleration and deceleration of the own vehicle when the vehicle driving assist apparatus stops executing both the acceleration/deceleration control and the steering control in response to the driver performing the automatic acceleration/deceleration rejection operation as the vehicle driving assist apparatus executes both the acceleration/deceleration control and the steering control. In this case, the vehicle driving assist apparatus does not restart to execute the acceleration/deceleration control when the driving assist restart switch is operated. Thus, the driving assist control can be executed in accordance with the intention of the driver.

Similarly, when the driver performs the automatic steering rejection operation as both the acceleration/deceleration control and the steering control are executed, the driver presumably has an intention not to desire the automatic steering of the own vehicle. The vehicle driving assist apparatus according to this aspect of the invention determines that the driver has an intention not to desire the automatic steering of the own vehicle when the vehicle driving assist apparatus stops executing both the acceleration/deceleration control and the steering control in response to the driver performing the automatic steering rejection operation as the vehicle driving assist apparatus executes both the acceleration/deceleration control and the steering control. In this case, the vehicle driving assist apparatus does not restart to execute the steering control when the driving assist restart switch is operated. Thus, the driving assist control can be executed in accordance with the intention of the driver.

According to further another aspect of the invention, the electronic control unit may be further configured to stop executing both the acceleration/deceleration control and the steering control in response to the driver performing the automatic acceleration/deceleration stop operation as the electronic control unit executes both the acceleration/deceleration control and the steering control.

In this case, the electronic control unit may be further configured to stop executing both the acceleration/deceleration control and the steering control in response to the driver performing the automatic steering stop operation as the electronic control unit executes both the acceleration/deceleration control and the steering control.

In this case, the electronic control unit may be further configured to restart to execute both the acceleration/deceleration control and the steering control when the driving assist restart switch is operated after the electronic control unit stopped executing both the acceleration/deceleration control and the steering control in response to the driver performing the automatic acceleration/deceleration stop operation.

In this case, the electronic control unit may be further configured to restart to execute both the acceleration/deceleration control and the steering control when the driving assist restart switch is operated after the electronic control unit stopped executing both the acceleration/deceleration control and the steering control in response to the driver performing the automatic steering stop operation.

According to further another aspect of the invention, the vehicle driving assist apparatus may further comprise a driving assist switch operated by the driver to stop executing the driving assist control.

In this case, the automatic acceleration/deceleration stop operation may be an operation performed by the driver to the driving assist switch as the electronic control unit executes the acceleration/deceleration control.

In this case, the automatic steering stop operation may be an operation performed by the driver to the driving assist switch as the electronic control unit executes the steering control.

When the driver operates the driving assist switch as the acceleration/deceleration control is executed, the driver does not always have an intention not to desire the automatic acceleration and deceleration of the own vehicle. Similarly, when the driver operates the driving assist switch as the steering control is executed, the driver does not always have an intention not to desire the automatic steering of the own vehicle. In the vehicle driving assist apparatus according to this aspect of the invention, the automatic acceleration/deceleration stop operation is the operation performed by the driver to the driving assist switch as the acceleration/deceleration control is executed, and the automatic steering stop operation is the operation performed by the driver to the driving assist switch as the steering control is executed. Therefore, the vehicle driving assist apparatus according to this aspect of the invention determines that the driver may have an intention to desire the automatic acceleration and deceleration of the own vehicle when the vehicle driving assist apparatus stops executing the acceleration/deceleration control in response to the driver operating the driving assist switch as the vehicle driving assist apparatus executes the acceleration/deceleration control. In this case, the vehicle driving assist apparatus restarts to execute the acceleration/deceleration control when the driving assist restart switch is operated. Similarly, the vehicle driving assist apparatus according to this aspect of the invention determines that the driver may have an intention to desire the automatic steering of the own vehicle when the vehicle driving assist apparatus stops executing the steering control in response to the driver operating the driving assist switch as the vehicle driving assist apparatus executes the steering control. In this case, the vehicle driving assist apparatus restarts to execute the steering control when the driving assist restart switch is operated. Thus, the driving assist control can be executed in accordance with the intention of the driver.

According to further another aspect of the invention, the electronic control unit may be further configured to execute a handsfree control as the driving assist control including (i) the acceleration control and (ii) the steering control and permitting the driver to release his/her hands from a steering operator operated by the driver to steer the own vehicle.

In this case, the electronic control unit may be further configured to stop executing the handsfree control in response to the driver performing the automatic acceleration/deceleration rejection operation as the electronic control unit executes the handsfree control.

In this case, the electronic control unit may be further configured to stop executing the handsfree control in response to the driver performing the automatic steering rejection operation as the electronic control unit executes the handsfree control.

In this case, the electronic control unit may be further configured not to restart to execute the handsfree control even when the driving assist restart switch is operated after the electronic control unit stopped executing the handsfree control in response to the driver performing the automatic acceleration/deceleration rejection operation.

In this case, the electronic control unit may be further configured not to restart to execute the handsfree control even when the driving assist restart switch is operated after the electronic control unit stopped executing the handsfree control in response to the driver performing the automatic steering rejection operation.

When the driver performs the automatic acceleration/deceleration rejection operation as the handsfree control is executed, the driver presumably has an intention not to desire the automatic acceleration and deceleration of the own vehicle. The vehicle driving assist apparatus according to the invention determines that the driver has an intention not to desire the automatic acceleration and deceleration of the own vehicle when the vehicle driving assist apparatus stops executing the handsfree control in response to the driver performing the automatic acceleration/deceleration rejection operation as the vehicle driving assist apparatus executes the handsfree control. In this case, the vehicle driving assist apparatus does not restart to execute the handsfree control even when the driving assist restart switch is operated. Thus, the driving assist control can be executed in accordance with the intention of the driver.

Similarly, when the driver performs the automatic steering rejection operation as the handsfree control is executed, the driver presumably has an intention not to desire the automatic steering of the own vehicle. The vehicle driving assist apparatus according to the invention determines that the driver has an intention not to desire the automatic steering of the own vehicle when the vehicle driving assist apparatus stops executing the handsfree control in response to the driver performing the automatic steering rejection operation as the vehicle driving assist apparatus executes the handsfree control. In this case, the vehicle driving assist apparatus does not restart to execute the handsfree control even when the driving assist restart switch is operated. Thus, the driving assist control can be executed in accordance with the intention of the driver.

According to further another aspect of the invention, the electronic control unit may be further configured to execute the steering control without restarting to execute the handsfree control when the driving assist restart switch is operated after the electronic control unit stopped executing the handsfree control in response to the driver performing the automatic acceleration/deceleration rejection operation.

In this case, the electronic control unit may be further configured to execute the acceleration/deceleration control without restarting to execute the handsfree control when the driving assist restart switch is operated after the electronic control unit stopped executing the handsfree control in response to the driver performing the automatic steering rejection operation.

When the driver performs the automatic acceleration/deceleration rejection operation as the handsfree control is executed, the driver presumably has an intention not to desire the automatic acceleration and deceleration of the own vehicle. The vehicle driving assist apparatus according to the invention determines that the driver has an intention not to desire the automatic acceleration and deceleration of the own vehicle when the vehicle driving assist apparatus stops executing the handsfree control in response to the driver performing the automatic acceleration/deceleration rejection operation as the vehicle driving assist apparatus executes the handsfree control. In this case, the vehicle driving assist apparatus executes the steering control without restarting to execute the handsfree control when the driving assist restart switch is operated. Thus, the driving assist control can be executed in accordance with the intention of the driver.

Similarly, when the driver performs the automatic steering rejection operation as the handsfree control is executed, the driver presumably has an intention not to desire the automatic steering of the own vehicle. The vehicle driving assist apparatus according to the invention determines that the driver has an intention not to desire the automatic steering of the own vehicle when the vehicle driving assist apparatus stops executing the handsfree control in response to the driver performing the automatic steering rejection operation as the vehicle driving assist apparatus executes the handsfree control. In this case, the vehicle driving assist apparatus executes the acceleration/deceleration control without restarting to execute the handsfree control when the driving assist restart switch is operated. Thus, the driving assist control can be executed in accordance with the intention of the driver.

According to further another aspect of the invention, the automatic acceleration/deceleration stop operation may be an operation indicating that the driver desires to temporarily stop executing the acceleration/deceleration control. In this case, the automatic steering stop operation may be an operation indicating that the driver desires to temporarily stop executing the steering control.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE PREFERRED EMBODIMENTS

Figure 1:
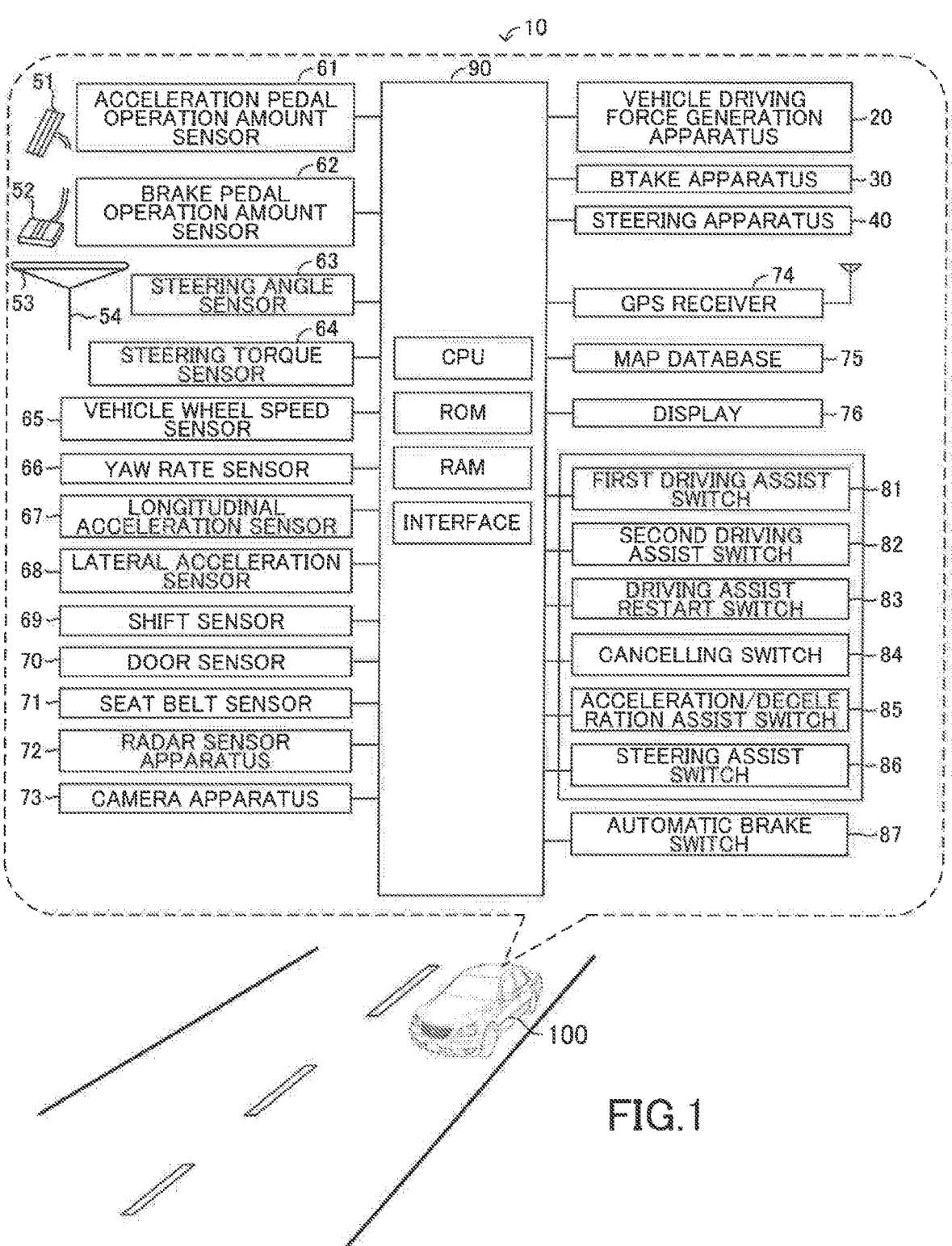
FIG. 1 is a view which shows a vehicle driving assist apparatus according to an embodiment of the invention and a vehicle to which the vehicle driving assist apparatus is applied.

Below, a vehicle driving assist apparatus according to an embodiment of the invention will be described with reference to the drawings. FIG. 1 shows the vehicle driving assist apparatus 10 according to the embodiment of the invention and a vehicle 100 to which the vehicle driving assist apparatus 10 is applied.

As shown in FIG. 1, the vehicle driving assist apparatus 10 includes an ECU 90. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, and routines memorized in the ROM.

The vehicle 100 is installed with a vehicle driving force generation apparatus 20, a brake apparatus 30, and a steering apparatus 40. The vehicle driving force generation apparatus 20 generates a driving force for driving the vehicle 100 and applies the generated driving force to driven wheels of the vehicle 100. The vehicle driving force generation apparatus 20 may be an internal combustion engine and/or an electric motor. The brake apparatus 30 applies a braking force for braking the vehicle 100 to vehicle wheels of the vehicle 100. The steering apparatus 40 applies a steering torque for steering the vehicle 100 to steered wheels of the vehicle 100.

The vehicle driving force generation apparatus 20, the brake apparatus 30, and the steering apparatus 40 are electrically connected to the ECU 90. The ECU 90 controls operations of the vehicle driving force generation apparatus 20 to control the driving force applied to the driven wheels of the vehicle 100. Further, the ECU 90 controls operations of the brake apparatus 30 to control the braking force applied to the vehicle wheels of the vehicle 100. Further, the ECU 90 controls operations of the steering apparatus 40 to control the steering torque applied to the steered wheels of the vehicle 100.

\<Sensors\>

The vehicle driving assist apparatus 10 includes an acceleration pedal operation amount sensor 61, a brake pedal operation amount sensor 62, a steering angle sensor 63, a steering torque sensor 64, a vehicle wheel speed sensor 65, a yaw rate sensor 66, a longitudinal acceleration sensor 67, a lateral acceleration sensor 68, a shift sensor 69, a door sensor 70, a seat belt sensor 71, a radar sensor apparatus 72, and a camera apparatus 73.

The acceleration pedal operation amount sensor 61 is electrically connected to the ECU 90. The acceleration pedal operation amount sensor 61 detects an amount AP of an operation applied to an acceleration pedal 51 by a driver of the vehicle 100 and sends a signal S61 representing the detected amount AP to the ECU 90. The ECU 90 acquires the amount AP of the operation applied to the acceleration pedal 51 as an acceleration pedal operation amount AP, based on the signal S61. The ECU 90 controls the operations of the vehicle driving force generation apparatus 20 to apply the driving force from the vehicle driving force generation apparatus 20 depending on the acceleration pedal operation amount AP to the driven wheels of the vehicle 100. The acceleration pedal 51 is one of acceleration operators operated by the driver to accelerate the vehicle 100.

The brake pedal operation amount sensor 62 is electrically connected to the ECU 90. The brake pedal operation amount sensor 62 detects an amount BP of an operation applied to a brake pedal 52 by the driver and sends a signal S62 representing the detected amount BP to the ECU 90. The ECU 90 acquires the amount BP of the operation applied to the brake pedal 52 as a brake pedal operation amount BP, based on the signal S62. The ECU 90 controls the operations of the brake apparatus 30 to apply the braking force from the brake apparatus 30 depending on the brake pedal operation amount BP to the vehicle wheels of the vehicle 100. The brake pedal 52 is one of brake operators operated by the driver to brake the vehicle 100.

The steering angle sensor 63 is electrically connected to the ECU 90. The steering angle sensor 63 detects an angle AGst of a rotation of a steering wheel 53 relative to a neutral position and sends a signal S63 representing the detected angle AGst to the ECU 90. The ECU 90 acquires the angle AGst of the rotation of the steering wheel 53 as a steering angle AGst, based on the signal S63. The steering wheel 53 is one of steering operators operated by the driver to steer the vehicle 100.

The steering torque sensor 64 is electrically connected to the ECU 90. The steering torque sensor 64 detects a torque TQst applied to a steering shaft 54 by the driver and sends a signal S64 representing the detected torque TQst to the ECU 90. The ECU 90 acquires the torque TQst applied to the steering shaft 54 as a steering torque TQst, based on the signal S64.

The ECU 90 controls the operations of the steering apparatus 40 to apply the steering torque from the brake apparatus 30 depending on the acquired steering angle AGst and the acquired steering torque TQst to the steered wheels of the vehicle 100.

The vehicle wheel speed sensor 65 is electrically connected to the ECU 90. The vehicle wheel speed sensor 65 detects rotation speeds Vrot of the vehicle wheels of the vehicle 100 and sends signals S65 representing the detected rotation speeds Vrot to the ECU 90. The ECU 90 acquires the rotation speeds Vrot of the vehicle wheels, based on the signals S65. Then, the ECU 90 acquires a moving speed SPD of the vehicle 100, based on the acquired rotation speeds Vrot of the vehicle wheels.

The yaw rate sensor 66 is electrically connected to the ECU 90. The yaw rate sensor 66 detects a yaw rate YR of the vehicle 100 and sends a signal S66 representing the detected yaw rate YR to the ECU 90. The ECU 90 acquires the yaw rate YR of the vehicle 100, based on the signal S66.

The longitudinal acceleration sensor 67 is electrically connected to the ECU 90. The longitudinal acceleration sensor 67 detects a longitudinal acceleration Gx of the vehicle 100 and sends a signal S67 representing the detected longitudinal acceleration Gx to the ECU 90. The ECU 90 acquires the longitudinal acceleration Gx of the vehicle 100, based on the signal S67.

The lateral acceleration sensor 68 is electrically connected to the ECU 90. The lateral acceleration sensor 68 detects a lateral acceleration Gy of the vehicle 100 and sends a signal S68 representing the detected lateral acceleration Gy to the ECU 90. The ECU 90 acquires the lateral acceleration Gy of the vehicle 100, based on the signal S68.

The shift sensor 69 is electrically connected to the ECU 90. The shift sensor 69 detects an operation position of a shift lever (not shown) of the vehicle 100 and sends a signal S69 representing the detected operation position to the ECU 90. The ECU 90 acquires the operation position of the shift lever of the vehicle 100, based on the signal S69. The shift lever can be set at any of a neutral position (or an N range), a forward moving position (or a D range), a rearward moving position (or a R range), and a locking position (or a P range). When the shift lever is set at the neutral position, the driving force is not transmitted to the driven wheels of the vehicle 100. When the shift lever is set at the forward moving position, the driving force is transmitted to the driven wheels of the vehicle 100 to move the vehicle 100 forward. When the shift lever is set at the rearward moving position, the driving force is transmitted to the driven wheels of the vehicle 100 to move the vehicle 100 rearward. When the shift lever is set at the locking position, the vehicle wheels of the vehicle 100 are locked.

The door sensor 70 is electrically connected to the ECU 90. The door sensor 70 sends low level signals S70L when doors (not shown) of the vehicle 100 are open. On the other hand, the door sensor 70 sends high level signals S70H when the doors of the vehicle 100 are closed. When the ECU 90 receives the low level signal S70L, the ECU 90 determines that the door of the vehicle 100 corresponding to the received low level signal S70L is open. On the other hand, when the ECU 90 receives the high level signal S70H, the ECU 90 determines that the door of the vehicle 100 corresponding to the received high level signal S70H is closed.

The seat belt sensor 71 is electrically connected to the ECU 90. The seat belt sensor 71 sends high level signals S71H when seat belts (not shown) of the vehicle 100 are fastened. On the other hand, the seat belt sensor 71 sends low level signals S71L when the seat belts of the vehicle 100 are unfastened. When the ECU 90 receives the high level signal S71H, the ECU 90 determines that the seat belt of the vehicle 100 corresponding to the received high level signal S71H is fastened. On the other hand, when the ECU 90 receives the low level signal S71L, the ECU 90 determines that the seat belt of the vehicle 100 corresponding to the received low level signal S71L is unfastened.

The radar sensor apparatus 72 includes following radar sensors.

(1) The radar sensor which radiates millimeter waves in a forward straight direction of the vehicle 100.

(2) The radar sensor which radiates millimeter waves in a forward left direction of the vehicle 100.

(3) The radar sensor which radiates millimeter waves in a forward right direction of the vehicle 100.

(4) The radar sensor which radiates millimeter waves in a lateral left direction of the vehicle 100.

(5) The radar sensor which radiates millimeter waves in a lateral right direction of the vehicle 100.

(6) The radar sensor which radiates millimeter waves in a rearward left direction of the vehicle 100.

(7) The radar sensor which radiates millimeter waves in a rearward right direction of the vehicle 100.

The radar sensors receive the millimeter waves reflected by an object.

The radar sensor apparatus 72 is electrically connected to the ECU 90. The radar sensor apparatus 72 sends signals representing information on the millimeter waves radiated from the radar sensors and the millimeter waves received by the radar sensors to the ECU 90. The ECU 90 acquires information on the object around the vehicle 100 as object information Iobj, based on the signals sent from the radar sensor apparatus 72. The object information Iobj includes information on a distance between the vehicle 100 and the object.

The camera apparatus 73 includes a camera which takes images of a view ahead of the vehicle 100. The camera apparatus 73 is electrically connected to the ECU 90. The camera apparatus 73 sends signals S73 representing information on the images taken by the camera to the ECU 90. The ECU 90 acquires information on situations ahead of the vehicle 100 as image information Iimg, based on the signals S73.

<Switches>

The vehicle driving assist apparatus 10 further includes a driving assist setting apparatus 80. The driving assist setting apparatus 80 includes a first driving assist switch 81, a second driving assist switch 82, a driving assist restart switch 83, a cancelling switch 84, an acceleration/deceleration assist switch 85, and a steering assist switch 86. The driving assist setting apparatus 80 is provided on a part of the vehicle 100 which the driver can operate with a finger of the driver, grasping the steering wheel 53. For example, the driving assist setting apparatus 80 is provided at a stay which supports a horn pad to an annular member of the steering wheel 53.

The first driving assist switch 81 is electrically connected to the ECU 90. The first driving assist switch 81 sends a signal S81 to the ECU 90 when the first driving assist switch 81 is operated by the driver. When the ECU 90 receives the signal S81, the ECU 90 determines that the first driving assist switch 81 is operated. The first driving assist switch 81 is one of switches operated by the driver to execute one or more of driving assist controls described later.

The second driving assist switch 82 is electrically connected to the ECU 90. The second driving assist switch 82 sends a signal S82 to the ECU 90 when the second driving assist switch 82 is operated by the driver. When the ECU 90 receives the signal S82, the ECU 90 determines that the second driving assist switch 82 is operated. The second driving assist switch 82 is one of the switches operated by the driver to execute any one or more of the driving assist controls described later.

The driving assist restart switch 83 is electrically connected to the ECU 90. The second driving assist switch 82 sends a signal S83 to the ECU 90 when the driving assist restart switch 83 is operated by the driver. When the ECU 90 receives the signal S83, the ECU 90 determines that the driving assist restart switch 83 is operated. The driving assist restart switch 83 is one of the switches operated by the driver to restart to execute any one or more of the driving assist controls described later which was stopped.

The cancelling switch 84 is electrically connected to the ECU 90. The cancelling switch 84 sends a signal S84 to the ECU 90 when the cancelling switch 84 is operated by the driver. When the ECU 90 receives the signal S84, the ECU 90 determines that the cancelling switch 84 is operated. The cancelling switch 84 is one of the switches operated by the driver to stop executing any one or more of the driving assist controls described later.

The acceleration/deceleration assist switch 85 is electrically connected to the ECU 90. The acceleration/deceleration assist switch 85 sends a signal S85 to the ECU 90 when the acceleration/deceleration assist switch 85 is operated by the driver. When the ECU 90 receives the signal S85, the ECU 90 determines that the acceleration/deceleration assist switch 85 is operated. The acceleration/deceleration assist switch 85 is one of the switches operated by the driver to execute and stop executing an inter-vehicle distance control described later of the driving assist controls.

The steering assist switch 86 is electrically connected to the ECU 90. The steering assist switch 86 sends a signal S86 to the ECU 90 when the steering assist switch 86 is operated by the driver. When the ECU 90 receives the signal S86, the ECU 90 determines that the steering assist switch 86 is operated. The steering assist switch 86 is one of the switches operated by the driver to execute and stop executing a lane keeping control described later of the driving assist controls.

An automatic brake switch 87 is provided at a part of the vehicle 100 which the driver can operate. The automatic brake switch 87 is electrically connected to the ECU 90. The automatic brake switch 87 sends an ON signal Son to the ECU 90 when the automatic brake switch 87 is set at an ON position. On the other hand, the automatic brake switch 87 sends an OFF signal Soff to the ECU 90 when the automatic brake switch 87 is set at an OFF position. When the ECU 90 receives the ON signal Son, the ECU 90 determines that the automatic brake switch 87 is set at the ON position. On the other hand, when the ECU 90 receives the OFF signal Soff, the ECU 90 determines that the automatic brake switch 87 is set at the OFF position.

<Other Components>

The vehicle driving assist apparatus 10 further includes a GPS receiver 74, a map database 75, and a display 76.

The GPS receiver 74 is electrically connected to the ECU 90. The GPS receiver 74 receives GPS signals S74 and sends the received GPS signals S74 to the ECU 90. The ECU 90 acquires a current position Pnow of the vehicle 100, based on the GPS signals S74.

The map database 75 is electrically connected to the ECU 90. The map database 75 memorizes map information Imap. In this embodiment, the map information Imap includes information on roads and information on a traffic regulations such as a regulation moving speed. The ECU 90 can acquire the map information Imap from the map database 75.

The display 76 is provided at a part of the vehicle 100 which the driver can see. The display 76 is electrically connected to the ECU 90. The ECU 90 can display various images on the display 76.

For example, the ECU 90 can cause the display 76 to display an image which the driver operates to set a destination in a handsfree control described later. The destination is a target place which the driver desires to cause the vehicle 100 to reach by the handsfree control. The driver can set the destination by operating the image displayed on the display 76. Further, the ECU 90 can cause the display 76 to display an image which the driver operates to set a target of a distance Dinter between the vehicle 100 and a forward moving vehicle in the inter-vehicle distance control described later. The driver can set the target of the distance Dinter as a set distance Dset by operating the image displayed on the display 76. Further, the ECU 90 can cause the display 76 to display an image which the driver operates to set a target of the moving speed SPD in the inter-vehicle distance control described later. The driver can set the target of the moving speed SPD as a set moving speed SPDset by operating the image displayed on the display 76.

<Summary of Operations of Vehicle Driving Assist Apparatus>

The vehicle driving assist apparatus 10 is configured to execute the driving assist controls. In this embodiment, the driving assist controls includes the inter-vehicle distance control, the lane keeping control, the handsfree control, a sideslip preventing control, and an automatic brake control.

<Inter-Vehicle Distance Control>

The inter-vehicle distance control is a control to automatically accelerate and decelerate the vehicle 100 to maintain the distance Dinter between the vehicle 100 and the forward moving vehicle at the set distance Dset even when the driver does not operate the acceleration pedal 51 and the brake pedal 52. Also, the inter-vehicle distance control is a control to automatically accelerate and decelerate the vehicle 100 to maintain the moving speed SPD at the set moving speed SPDset when there is no vehicle ahead of the vehicle 100. Therefore, the inter-vehicle distance control is one of acceleration/deceleration controls to automatically accelerate and decelerate the vehicle 100.

The inter-vehicle distance control is not a control to automatically steer the vehicle 100. Therefore, the inter-vehicle distance control is a control which does not allow the driver to release his/her hands from the steering wheel 53. Thus, the inter-vehicle distance control is one of non-handsfree controls which do not allow the driver to release his/her hands from a steering operator (in this embodiment, the steering wheel 53) which the driver operates to steer the vehicle 100.

The vehicle driving assist apparatus 10 starts to execute the inter-vehicle distance control when an inter-vehicle distance control execution condition Cacc_start becomes satisfied. The inter-vehicle distance control execution condition Cacc_start becomes satisfied when any one of execution conditions Cacc_start_1 and Cacc_start_2 described below becomes satisfied.

(1) The execution condition Cacc_start_1 is a condition that (i) the first driving assist switch 81 is operated, (ii) a handsfree control execution condition Cads_start described later is not satisfied, and (iii) any one of the driving assist control is not executed.

(2) The execution condition Cacc_start_2 is a condition that (i) the second driving assist switch 82 is operated, and (ii) any one of the driving assist controls is not executed.

It should be noted that the vehicle driving assist apparatus 10 may be configured to execute a constant moving speed control in place of the inter-vehicle distance control. The constant moving speed control is a control to automatically accelerate and decelerate the vehicle 100 to maintain the moving speed SPD of the vehicle 100 at the set moving speed SPDset. Thus, the constant moving speed control is one of the acceleration/deceleration controls to automatically accelerate and decelerate the vehicle 100.

The constant moving speed control is not a control to automatically steer the vehicle 100. Therefore, the constant moving speed control is a control which does not allow the driver to release his/her hands from the steering wheel 53. Thus, the constant moving speed control is one of the non-handsfree controls which do not allow the driver to release his/her hands from the steering operator (in this embodiment, the steering wheel 53) which the driver operates to steer the vehicle 100.

In this case, the vehicle driving assist apparatus 10 starts to execute the constant moving speed control when a constant moving speed control execution condition Ccc_start becomes satisfied. The constant moving speed control execution condition Ccc_start becomes satisfied when any one of the execution conditions Cacc_start_1 and Cacc-_start_2 becomes satisfied.

<Lane Keeping Control>

The lane keeping control is a control to automatically steer the vehicle 100 to maintain the vehicle 100 in a traffic lane where the vehicle 100 currently moves even when the driver does not operate the steering wheel 53. Therefore, the lane keeping control is one of steering controls to automatically steer the vehicle 100.

The lane keeping control is a control which do not need an operation of the driver to the steering wheel 53. However, the lane keeping control is not a control which allows the driver to release his/her hands from the steering wheel 53. Thus, the lane keeping control is one of the non-handsfree controls which do not allow the driver to release his/her hands from the steering operator (in this embodiment, the steering wheel 53) which the driver operates to steer the vehicle 100.

The vehicle driving assist apparatus 10 starts to execute the lane keeping control when a lane keeping control execution condition Clta_start becomes satisfied. The lane keeping control execution condition Clta_start becomes satisfied when any one of execution conditions Clta_start_1 to Clta_start_4 described below becomes satisfied.

(1) The execution condition Clta_start_1 is a condition that (i) the first driving assist switch 81 is operated, (ii) the handsfree control execution condition Cads_start described later is not satisfied, and (iii) any one of the driving assist controls is not executed.

(2) The execution condition Clta_start_2 is a condition that (i) the second driving assist switch 82 is operated, and (ii) any one of the driving assist controls is not executed.

(3) The execution condition Clta_start_3 is a condition that (i) the steering assist switch 86 is operated, and (ii) any one of the driving assist controls is not executed.

(4) The execution condition Clta_start_4 is a condition that (i) the steering assist switch 86 is operated, (ii) the handsfree control execution condition Cads_start described later is not satisfied, and (iii) the inter-vehicle distance control is executed.

As can be understood from the descriptions above, in this embodiment, the vehicle driving assist apparatus 10 starts to execute both the inter-vehicle distance control and the lane keeping control when both the inter-vehicle distance control execution conditions Cacc_start and the lane keeping control execution condition Clta_start become satisfied.

<Handsfree Control>

The handsfree control is a control to automatically accelerate, decelerate, and steer the vehicle 100 to cause the vehicle 100 to safely move to the destination even when the driver does not operate the acceleration pedal 51 and the brake pedal 52, and releases his/her hands from the steering wheel 53. Therefore, the handsfree control is one of controls which include both the acceleration/deceleration control and the steering control and allow the driver to release his/her hands from the steering operator (in this embodiment, the steering wheel 53) which the driver operates to steer the vehicle 100.

The vehicle driving assist apparatus 10 starts to execute the handsfree control when the handsfree control execution condition Cads_start becomes satisfied. The handsfree control execution condition Cads_start becomes satisfied when all of execution conditions Cads_start_1 to Cads_start_3 described below become satisfied.

(1) The execution condition Cads_start_1 is a condition that an accuracy level of the map information Imap relating to an area including a moving route of the vehicle 100 to the destination is higher than a predetermined level.

(2) The execution condition Cads_start_2 is a condition that an accuracy level of information on the current position Pnow of the vehicle 100 is higher than a predetermined level.

(3) The execution condition Cads_start_3 is a condition that (i) the first driving assist switch 81 is operated, and (ii) any one of the driving assist controls is not executed.

Further, the handsfree control execution condition Cads_start becomes satisfied when a switching condition Cads_change_1 described below becomes satisfied.

(1) The switching condition Cads_change_1 is a condition that (i) the execution conditions Cads_start_1 and Cads_start_2 become satisfied, and (ii) the inter-vehicle distance control and the lane keeping control were started since the execution conditions Cads_start_1 and Cads_start_2 were not satisfied when the execution condition Cads_start_3 became satisfied.

<Sideslip Preventing Control>

The sideslip preventing control is a control to prevent the vehicle 100 from slipping sideways. The vehicle driving assist apparatus 10 starts to execute the sideslip preventing control when a sideslip preventing control execution condition Cvsc_start becomes satisfied. The sideslip preventing control execution condition Cvsc_start becomes satisfied when an execution condition Cvsc_start_1 described below becomes satisfied.

(1) The execution condition Cvsc_start_1 is a condition that the vehicle 100 slips sideways. It should be noted that the vehicle driving assist apparatus 10 determines whether the vehicle 100 slips sideways, based on the rotation speeds Vrot of the vehicle wheels of the vehicle 100, the moving speed SPD of the vehicle 100, steered angles of the driven wheels of the vehicle 100, the lateral acceleration Gy, and the yaw rate YR <Automatic Brake Control>

The automatic brake control is a control to prevent the vehicle 100 from colliding with the object. The vehicle driving assist apparatus 10 starts to execute the automatic brake control when an automatic brake control execution condition Cpcs_start becomes satisfied. The automatic brake control execution condition Cpcs_start becomes satisfied when both execution conditions Cpcs_start_1 and Cpcs_start_2 described below become satisfied.

(1) The execution condition Cpcs_start_1 is a condition that the automatic brake switch 87 is set at the ON position.

(2) The execution condition Cpcs_start_2 is a condition that a time taken for the vehicle 100 to reach the object becomes shorter than or equal to a threshold time.

<Stopping Inter-Vehicle Distance Control>

The vehicle driving assist apparatus 10 stops executing the inter-vehicle distance control when an inter-vehicle distance control stop condition Cacc_stop becomes satisfied. The inter-vehicle distance control stop condition Cacc_stop becomes satisfied when any one of stop conditions Cacc_stop_1 to Cacc_stop_4 described below becomes satisfied.

(1) The stop condition Cacc_stop_1 is a condition that (i) any one of the first driving assist switch 81, the second driving assist switch 82, and the cancelling switch 84 is operated, and (ii) the inter-vehicle distance control is executed.

(2) The stop condition Cacc_stop_2 is a condition that (i) the acceleration/deceleration assist switch 85 is operated, and (ii) the inter-vehicle distance control is executed.

(3) The stop condition Cacc_stop_3 is a condition that (i) any one of an acceleration/deceleration conditions Caccel_1 and Caccel_2 described below becomes satisfied, and (ii) the inter-vehicle distance control is executed.

(4) The stop condition Cacc_stop_4 is a condition that (i) any one of additional conditions Cadd_1 to Cadd_6 described below becomes satisfied, and (ii) the inter-vehicle distance control is executed.

(1) The acceleration/deceleration condition Caccel_1 is a condition that the acceleration pedal operation amount AP becomes equal to or larger than a predetermined operation amount APth.

(2) The acceleration/deceleration condition Caccel_2 is a condition that the brake pedal operation amount BP becomes equal to or larger than a predetermined operation amount BPth.

(1) The additional condition Cadd_1 is a condition that the shift lever is set at a position other than the forward moving position.

(2) The additional condition Cadd_2 is a condition that at least one of the doors of the vehicle 100 opens.

(3) The additional condition Cadd_3 is a condition that at least one of the seat belts of the vehicle 100 is unfastened.

(4) The additional condition Cadd_4 is a condition that the sideslip preventing control is started.

(5) The additional condition Cadd_5 is a condition that the automatic brake switch 87 is set at the OFF position.

(6) The additional condition Cadd_6 is a condition that the automatic brake control is started.

It should be noted that the vehicle driving assist apparatus 10 stops executing the constant moving speed control when (i) a constant moving speed control stop condition Ccc_stop becomes satisfied. The constant moving speed control stop condition Ccc_stop becomes satisfied when any one of stop conditions Ccc_stop_1 to Ccc_stop_4 described below becomes satisfied.

(1) The stop condition Ccc_stop_1 is a condition that any one of the first driving assist switch 81, the second driving assist switch 82, and the cancelling switch 84 is operated.

(2) The stop condition Ccc_stop_2 is a condition that (i) the acceleration/deceleration assist switch 85 is operated, and (ii) the constant moving speed control is executed.

(3) The stop condition Ccc_stop_3 is a condition that (i) any one of the acceleration/deceleration conditions Caccel_1 and Caccel_2 becomes satisfied, and (ii) the constant moving speed control is executed.

(4) The stop condition Ccc_stop_4 is a condition that (i) any one of the additional conditions Cadd_1 to Cadd_6 becomes satisfied, and (ii) the constant moving speed control is executed.

<Stopping Lane Keeping Control>

The vehicle driving assist apparatus 10 stops executing the lane keeping control when a lane keeping control stop condition Clta_stop becomes satisfied. The lane keeping control stop condition Clta_stop becomes satisfied when any one of stop conditions Clta_stop_1 to Clta_stop_4 described below becomes satisfied.

(1) The stop condition Clta_stop_1 is a condition that (i) any one of the first driving assist switch 81, the second driving assist switch 82, and the cancelling switch 84 is operated, and (ii) the lane keeping control is executed.

(2) The stop condition Clta_stop_2 is a condition that (i) the steering assist switch 86 is operated, and (ii) the lane keeping control is executed.

(3) The stop condition Clta_stop_3 is a condition that (i) any one of steering conditions Cst_1 and Cst_2 described below becomes satisfied, and (ii) the lane keeping control is executed.

(4) The stop condition Clta_stop_4 is a condition that (i) any one of the additional conditions Cadd_1 to Cadd_6 becomes satisfied, and (ii) the lane keeping control is executed.

(1) The steering condition Cst_1 is a condition that (i) the steering angle AGst becomes equal to or larger than a predetermined steering angle AGst_th, and (ii) the lane keeping control is executed.

(2) The steering condition Cst_2 is a condition that (i) the steering torque TQst becomes equal to or larger than a predetermined steering torque TQst_th, and (ii) the lane keeping control is executed.

<Stopping Handsfree Control>

The vehicle driving assist apparatus 10 stops executing the handsfree control when a handsfree control stop condition Cads_stop becomes satisfied. In this case, the vehicle driving assist apparatus 10 does not start to execute the inter-vehicle distance control and the lane keeping control when the vehicle driving assist apparatus 10 stops executing the handsfree control. The handsfree control stop condition Cads_stop becomes satisfied when any one of stop conditions Cads_stop_1 to Cads_stop_6 described below becomes satisfied.

(1) The stop condition Cads_stop_1 is a condition that (i) any one of the first driving assist switch 81, the second driving assist switch 82, and the cancelling switch 84 is operated, and (ii) the handsfree control is executed.

(2) The stop condition Cads_stop_2 is a condition that (i) the steering assist switch 86 is operated, and (ii) the handsfree control is executed.

(3) The stop condition Cads_stop_3 is a condition that (i) any one of the steering conditions Cst_1 and Cst_2 becomes satisfied, and (ii) the handsfree control is executed.

(4) The stop condition Cads_stop_4 is a condition that (i) the acceleration/deceleration assist switch 85 is operated, and (ii) the handsfree control is executed.

(5) The stop condition Cads_stop_5 is a condition that (i) any one of the acceleration/deceleration conditions Caccel_1 and Caccel_2 becomes satisfied, and (ii) the handsfree control is executed.

(6) The stop condition Cads_stop_6 is a condition that (i) any one of the additional conditions Cadd_1 to Cadd_6 becomes satisfied, and (ii) the handsfree control is executed.

<Changing Handsfree Control to Inter-Vehicle Distance Control>

The vehicle driving assist apparatus 10 stops executing the handsfree control and starts to execute the inter-vehicle distance control when an inter-vehicle distance control changing condition Cacc_change becomes satisfied. The inter-vehicle distance control changing condition Cacc_change becomes satisfied when any one of changing conditions Cacc_change_1 and Cacc_change_2 described below becomes satisfied.

(1) The changing condition Cacc_change_1 is a condition that (i) the accuracy level of the information on the current position Pnow of the vehicle 100 becomes lower than the predetermined level, and (ii) the handsfree control is executed.

(2) The changing condition Cacc_change_2 is a condition that (i) the accuracy level of the map information Imap relating to the area where the vehicle 100 moves becomes lower than the predetermined level, and (ii) the handsfree control is executed. It should be noted that the accuracy level of the map information Imap relating to the area where the vehicle 100 moves is lower than the predetermined level when the map information Imap relating to the area where the vehicle 100 moves is not memorized in the map database 75.

The vehicle driving assist apparatus 10 stops executing the handsfree control and starts to execute the constant moving speed control when a constant moving speed control changing condition Ccc_change becomes satisfied. The constant moving speed control changing condition Ccc_change becomes satisfied when any one of changing conditions Ccc_change_1 and Ccc_change_2 becomes satisfied. The changing conditions Ccc_change_1 and Ccc_change_2 are the same as the changing conditions Cacc_change_1 and Cacc_change_2, respectively.

<Changing Handsfree Control to Lane Keeping Control>

The vehicle driving assist apparatus 10 stops executing the handsfree control and starts to execute the lane keeping control when a lane keeping control changing condition Clta_change becomes satisfied. The lane keeping control changing condition Clta_change becomes satisfied when any one of changing conditions Clta_change_1 and Clta_change_2 described below becomes satisfied.

(1) The changing condition Clta_change_1 is a condition that (i) the accuracy level of the information on the current position Pnow of the vehicle 100 becomes lower than the predetermined level, and (ii) the handsfree control is executed.

(2) The changing condition Clta_change_2 is a condition that (i) the accuracy level of the map information Imap relating to the area where the vehicle 100 moves becomes lower than the predetermined level, and (ii) the handsfree control is executed. It should be noted that the accuracy level of the map information Imap relating to the area where the vehicle 100 moves is lower than the predetermined level when the map information Imap relating to the area where the vehicle 100 moves is not memorized in the map database 75.

It should be noted that the changing conditions Cacc_change_1 and Clta_change_1 are the same as each other. Therefore, the vehicle driving assist apparatus 10 stops executing the handsfree control and starts to execute both the inter-vehicle distance control and the lane keeping control when the accuracy level of the information on the current position Pnow of the vehicle 100 becomes lower than the predetermined level.

Similarly, the changing condition Cacc_change_2 and the changing condition Clta_change_2 are the same as each other. Therefore, the vehicle driving assist apparatus 10 stops executing the handsfree control and starts to execute both the inter-vehicle distance control and the lane keeping control when the accuracy level of the map information Imap relating to the area where the vehicle 100 moves becomes lower than the predetermined level.

<Restarting Inter-Vehicle Distance Control>

When the driver operates the acceleration/deceleration assist switch 85 as the inter-vehicle distance control is executed, the driver presumably has an intention not to desire an automatic acceleration and deceleration of the vehicle 100. Also, when the driver operates the acceleration pedal 51 to a relatively large extent as the inter-vehicle distance control is executed, the driver presumably has an intention not to desire the automatic acceleration and deceleration of the vehicle 100. Also, when the driver operates the brake pedal 52 to a relatively large extent as the inter-vehicle distance control is executed, the driver presumably has an intention not to desire the automatic acceleration and deceleration of the vehicle 100. When the driver presumably has an intention not to desire the automatic acceleration and deceleration of the vehicle 100, the inter-vehicle distance control should not be restarted in consideration of an intention of the driver even if the driver operates the driving assist restart switch 83 after the inter-vehicle distance control is stopped.

Accordingly, the vehicle driving assist apparatus 10 restarts to execute the inter-vehicle distance control in response to an inter-vehicle distance control restart condition Cacc_restart becoming satisfied. The inter-vehicle distance control restart condition Cacc_restart becomes satisfied when any one of restart conditions Cacc_restart_1 to Cacc_restart_4 described below becomes satisfied.

(1) The restart condition Cacc_restart_1 is a condition that (i) the driving assist restart switch 83 is operated, (ii) any one of the driving assist controls is not executed, and (iii) the inter-vehicle distance control was stopped in response to any one of the first driving assist switch 81, the second driving assist switch 82, and the cancelling switch 84 being operated.

(2) The restart condition Cacc_restart_2 is a condition that (i) the driving assist restart switch 83 is operated, (ii) any one of the driving assist controls is not executed, and (iii) the inter-vehicle distance control was stopped in response to any one of the additional conditions Cadd_1 to Cadd_6 becoming satisfied.

(3) The restart condition Cacc_restart_3 is a condition that (i) the driving assist restart switch 83 is operated, (ii) any one of the driving assist controls is not executed, and (iii) the inter-vehicle distance control of the handsfree control was stopped in response to the steering assist switch 86 being operated.

(4) The restart condition Cacc_restart_4 is a condition that (i) the driving assist restart switch 83 is operated, (ii) any one of the driving assist controls is not executed, and (iii) the inter-vehicle distance control of the handsfree control was stopped in response to any one of the steering conditions Cst_1 and Cst_2 becoming satisfied.

Figure 2A:
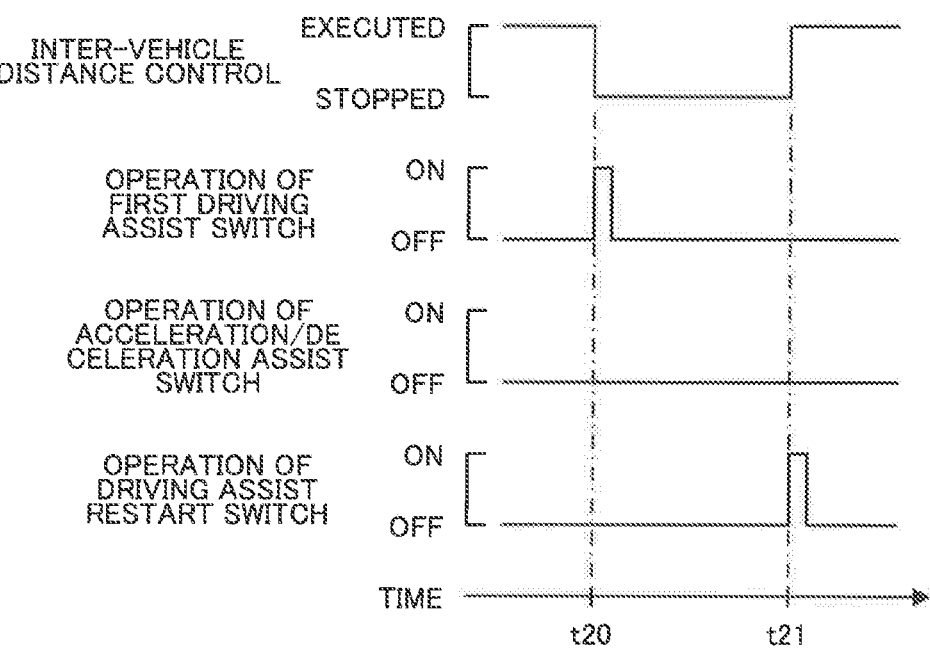
FIG. 2A is a view used for describing operations of the vehicle driving assist apparatus when a driving assist restart switch is operated after an inter-vehicle distance control is stopped.

According to the vehicle driving assist apparatus 10, as shown in FIG. 2A, when (i) the inter-vehicle distance control is forcibly stopped in response to the first driving assist switch 81 being operated at a timing t20, and then (ii) the driving assist restart switch 83 is operated at a timing t21, the inter-vehicle distance control is restarted in response to the driving assist restart switch 83 being operated. That is, the vehicle driving assist apparatus 10 determines that the driver has an intention to desire the automatic acceleration and deceleration of the vehicle 100 when the vehicle driving assist apparatus 10 forcibly stops executing the inter-vehicle distance control in response to the first driving assist switch 81 being operated. Thereafter, the vehicle driving assist apparatus 10 restarts to execute the inter-vehicle distance control in response to the driving assist restart switch 83 being operated as the vehicle driving assist apparatus 10 does not execute any driving assist controls. Thereby, the driving assist controls are executed in accordance with the intention of the driver.

Figure 2B:
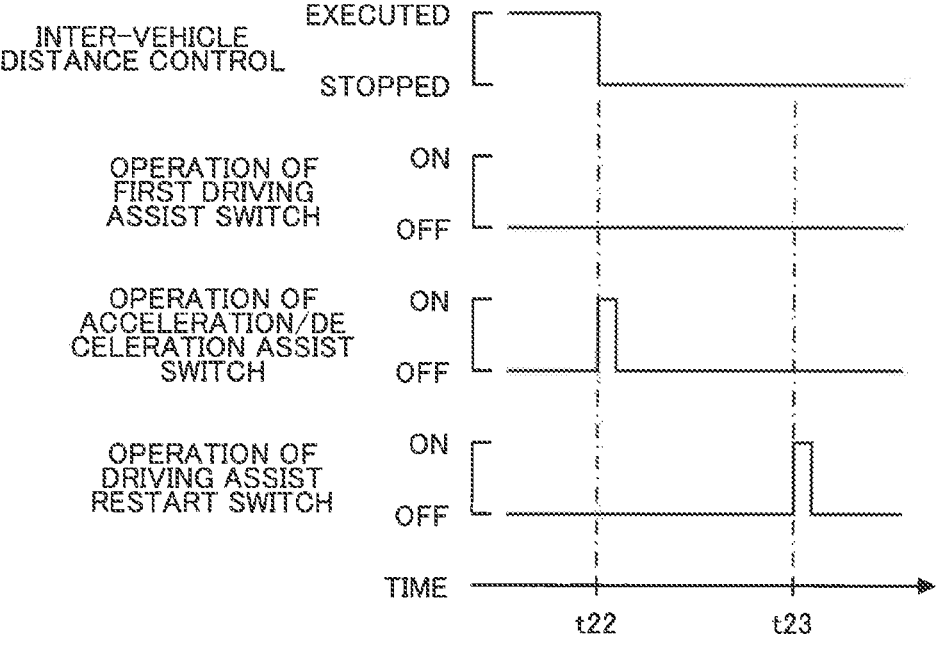
FIG. 2B is a view used for describing the operations of the vehicle driving assist apparatus when the driving assist restart switch is operated after the inter-vehicle distance control is stopped.

On the other hand, as shown in FIG. 2B, when (i) the inter-vehicle distance control is forcibly stopped in response to the acceleration/deceleration assist switch 85 being operated at a timing t22, and then (ii) the driving assist restart switch 83 is operated at a timing t23, the inter-vehicle distance control is not restarted in response to the driving assist restart switch 83 being operated. That is, the vehicle driving assist apparatus 10 determines that the driver has an intention not to desire the automatic acceleration and deceleration of the vehicle 100 when the vehicle driving assist apparatus 10 forcibly stops executing the inter-vehicle distance control in response to the acceleration/deceleration assist switch 85 being operated. Similarly, the vehicle driving assist apparatus 10 determines that the driver has an intention not to desire the automatic acceleration and deceleration of the vehicle 100 when the vehicle driving assist apparatus 10 forcibly stops executing the inter-vehicle distance control in response to any one of the acceleration/deceleration conditions Caccel_1 and Caccel_2 becoming satisfied. Thereafter, the vehicle driving assist apparatus 10 does not restart to execute the inter-vehicle distance control in response to the driving assist restart switch 83 being operated as the vehicle driving assist apparatus 10 does not execute any driving assist controls. Thereby, the driving assist controls are executed in accordance with the intention of the driver.

It should be noted that the vehicle driving assist apparatus 10 may be configured not to restart to execute the inter-vehicle distance control in response to the restart condition Cacc_restart_2 becoming satisfied.

Further, the vehicle driving assist apparatus 10 restarts to execute the constant moving speed control when a constant moving speed control restart condition Ccc_restart becomes satisfied. The constant moving speed control restart condition Ccc_restart becomes satisfied in response to any one of restart conditions Ccc_restart_1 to Ccc_restart_4 becoming satisfied.

(1) The restart condition Ccc_restart_1 is a condition that (i) the driving assist restart switch 83 is operated, (ii) any one of the driving assist controls is not executed, and (iii) the constant moving speed control was stopped in response to any one of the first driving assist switch 81, the second driving assist switch 82, and the cancelling switch 84 being operated.

(2) The restart condition Ccc_restart_2 is a condition that (i) the driving assist restart switch 83 is operated, (ii) any one of the driving assist controls is not executed, and (iii) the constant moving speed control was stopped in response to any one of the additional conditions Cadd_1 to Cadd_6 becoming satisfied.

(3) The restart condition Ccc_restart_3 is a condition that (i) the driving assist restart switch 83 is operated, (ii) any one of the driving assist controls is not executed, and (iii) the constant moving speed control of the handsfree control was stopped in response to the steering assist switch 86 being operated.

(4) The restart condition Ccc_restart_4 is a condition that (i) the driving assist restart switch 83 is operated, (ii) any one of the driving assist controls is not executed, and (iii) the constant moving speed control of the handsfree control was stopped in response to any one of the steering conditions Cst_1 and Cst_2 becoming satisfied.

According to the vehicle driving assist apparatus 10, when (i) the constant moving speed control is forcibly stopped in response to the first driving assist switch 81 being operated, and then (ii) the driving assist restart switch 83 is operated, the constant moving speed control is restarted in response to the driving assist restart switch 83 being operated. That is, the vehicle driving assist apparatus 10 determines that the driver has an intention to desire the automatic acceleration and deceleration of the vehicle 100 when the vehicle driving assist apparatus 10 forcibly stops executing the constant moving speed control in response to the first driving assist switch 81 being operated. Thereafter, the vehicle driving assist apparatus 10 restarts to execute the constant moving speed control in response to the driving assist restart switch 83 being operated as the vehicle driving assist apparatus 10 does not execute any driving assist controls. Thereby, the driving assist controls are executed in accordance with the intention of the driver.

On the other hand, when (i) the constant moving speed control is forcibly stopped in response to the acceleration/deceleration assist switch 85 being operated, and then (ii) the driving assist restart switch 83 is operated, the constant moving speed control is not restarted in response to the driving assist restart switch 83 being operated. That is, the vehicle driving assist apparatus 10 determines that the driver has an intention not to desire the automatic acceleration and deceleration of the vehicle 100 when the vehicle driving assist apparatus 10 forcibly stops executing the constant moving speed control in response to the acceleration/deceleration assist switch 85 being operated. Similarly, the vehicle driving assist apparatus 10 determines that the driver has an intention not to desire the automatic acceleration and deceleration of the vehicle 100 when the vehicle driving assist apparatus 10 forcibly stops executing the constant moving speed control in response to any one of the acceleration/deceleration conditions Caccel_1 and Caccel_2 becoming satisfied. Thereafter, the vehicle driving assist apparatus 10 does not restart to execute the constant moving speed control in response to the driving assist restart switch 83 being operated as the vehicle driving assist apparatus 10 does not execute any driving assist controls. Thereby, the driving assist controls are executed in accordance with the intention of the driver.

It should be noted that the vehicle driving assist apparatus 10 may be configured not to restart to execute the constant moving speed control in response to the restart condition Cacc_restart_2 becoming satisfied.

<Restarting Lane Keeping Control>

When the driver operates the steering assist switch 86 as the lane keeping control is executed, the driver presumably has an intention not to desire the automatic steering of the vehicle 100. Also, when the driver operates the steering wheel 53 to a relatively large extent as the lane keeping control is executed, the driver presumably has an intention not to desire the automatic steering of the vehicle 100. When the driver presumably has an intention not to desire the automatic steering of the vehicle 100, the lane keeping control should not be restarted in consideration of the intention of the driver even if the driver operates the driving assist restart switch 83 after the lane keeping control is stopped.

Accordingly, the vehicle driving assist apparatus 10 restarts to execute the lane keeping control in response to a lane keeping control restart condition Clta_restart becoming satisfied. The lane keeping control restart condition Clta_restart becomes satisfied when any one of restart condition Clta_restart_1 to Clta_restart_4 described below becomes satisfied.

(1) The restart condition Clta_restart_1 is a condition that (i) the driving assist restart switch 83 is operated, (ii) any one of the driving assist controls is not executed, and (iii) the lane keeping control was stopped in response to any one of the first driving assist switch 81, the second driving assist switch 82, and the cancelling switch 84 being operated.

(2) The restart condition Clta_restart_2 is a condition that (i) the driving assist restart switch 83 is operated, (ii) any one of the driving assist controls is not executed, and (iii) the lane keeping control was stopped in response to any one of the additional conditions Cadd_1 to Cadd_6 becoming satisfied.

(3) The restart condition Clta_restart_3 is a condition that (i) the driving assist restart switch 83 is operated, (ii)

any one of the driving assist controls is not executed, and (iii) the lane keeping control of the handsfree control was stopped in response to the acceleration/deceleration assist switch 85 being operated.

(4) The restart condition Clta_restart_4 is a condition that (i) the driving assist restart switch 83 is operated, (ii) any one of the driving assist controls is not executed, and (iii) the lane keeping control of the handsfree control was stopped in response to any one of the acceleration/deceleration conditions Caccel_1 and Caccel_2 becoming satisfied.

Figure 3A:
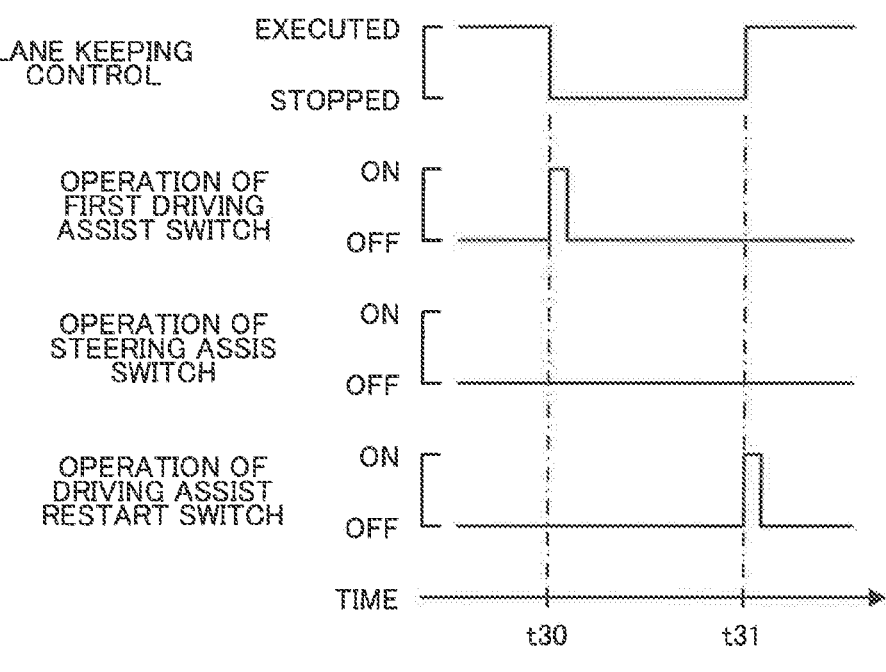
FIG. 3A is a view used for describing the operations of the vehicle driving assist apparatus when the driving assist restart switch is operated after a lane keeping control is stopped.

According to the vehicle driving assist apparatus 10, as shown in FIG. 3A, when (i) the lane keeping control is forcibly stopped in response to the first driving assist switch 81 being operated at a timing t30, and then (ii) the driving assist restart switch 83 is operated at a timing t31, the lane keeping control is restarted in response to the driving assist restart switch 83 being operated. That is, the vehicle driving assist apparatus 10 determines that the driver has an intention to desire the automatic steering of the vehicle 100 when the vehicle driving assist apparatus 10 forcibly stops executing the lane keeping control in response to the first driving assist switch 81 being operated. Thereafter, the vehicle driving assist apparatus 10 restarts to execute the lane keeping control in response to the driving assist restart switch 83 being operated as the vehicle driving assist apparatus 10 does not execute any driving assist controls. Thereby, the driving assist controls are executed in accordance with the intention of the driver.

Figure 3B:
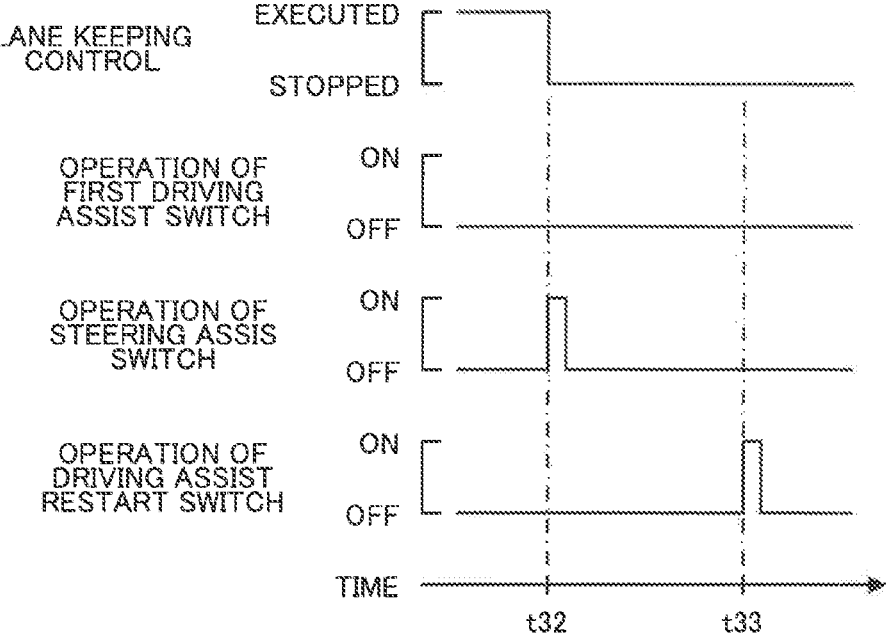
FIG. 3B is a view used for describing the operations of the vehicle driving assist apparatus when the driving assist restart switch is operated after the lane keeping control is stopped.

On the other hand, as shown in FIG. 3B, when (i) the lane keeping control is forcibly stopped in response to the steering assist switch 86 being operated at a timing t32, and then (ii) the driving assist restart switch 83 is operated at a timing t33, the lane keeping control is not restarted in response to the driving assist restart switch 83 being operated. That is, the vehicle driving assist apparatus 10 determines that the driver has an intention not to desire the automatic steering of the vehicle 100 when the vehicle driving assist apparatus 10 forcibly stops executing the lane keeping control in response to the steering assist switch 86 being operated. Similarly, the vehicle driving assist apparatus 10 determines that the driver has an intention not to desire the automatic steering of the vehicle 100 when the vehicle driving assist apparatus 10 forcibly stops executing the lane keeping control in response to any one of the steering conditions Cst_1 and Cst_2 becoming satisfied. Thereafter, the vehicle driving assist apparatus 10 does not restart to execute the lane keeping control in response to the driving assist restart switch 83 being operated as the vehicle driving assist apparatus 10 does not execute any driving assist controls. Thereby, the driving assist controls are executed in accordance with the intention of the driver.

As can be understood from the above description, the inter-vehicle distance control and the lane keeping control are both stopped in response to any one of the first driving assist switch 81, the second driving assist switch 82, and the cancelling switch 84 being operated. Thereafter, the inter-vehicle distance control restart condition Cacc_restart and the lane keeping control restart condition Clta_restart become satisfied in response to the driving assist restart switch 83 being operated as the driving assist controls are not executed. When the inter-vehicle distance control restart condition Cacc_restart and the lane keeping control restart condition Clta_restart become satisfied, the vehicle driving assist apparatus 10 restarts to execute both the inter-vehicle distance control and the lane keeping control.

It should be noted that the vehicle driving assist apparatus 10 may be configured not to restart to execute the lane keeping control in response to the restart condition Clta_restart_2 becoming satisfied.

<Restarting Handsfree Control>

When the driver operates the acceleration/deceleration assist switch 85 as the handsfree control is executed, the driver presumably has an intention not to desire the automatic acceleration and deceleration of the vehicle 100. Also, when the driver operates the acceleration pedal 51 to a relatively large extent as the handsfree control is executed, the driver presumably has an intention not to desire the automatic acceleration and deceleration of the vehicle 100. Also, when the driver operates the brake pedal 52 to a relatively large extent as the handsfree control is executed, the driver presumably has an intention not to desire the automatic acceleration and deceleration of the vehicle 100. When the driver presumably has an intention not to desire the automatic acceleration and deceleration of the vehicle 100, the handsfree control should not be restarted in consideration of the intention of the driver even if the driver operates the driving assist restart switch 83 after the handsfree control is stopped.

Accordingly, the vehicle driving assist apparatus 10 restarts to execute the handsfree control in response to a handsfree control restart condition Cads_restart becoming satisfied. The handsfree control restart condition Cads_restart becomes satisfied when any one of restart conditions Cads_restart_1 and Cads_restart_2 described below becomes satisfied.

(1) The restart condition Cads_restart_1 is a condition that (i) the driving assist restart switch 83 is operated, (ii) the handsfree control execution condition Cads_start is satisfied, (iii) any one of the driving assist controls is not executed, and (iv) the handsfree control was stopped in response to any one of the first driving assist switch 81, the second driving assist switch 82, and the cancelling switch 84 being operated.

(2) The restart condition Cads_restart_2 is a condition that (i) the driving assist restart switch 83 is operated, (ii) the handsfree control execution condition Cads_start is satisfied, (iii) any one of the driving assist controls is not executed, and (iv) the handsfree control was stopped in response to any one of the additional conditions Cadd_1 to Cadd_6 becoming satisfied.

Figure 4:
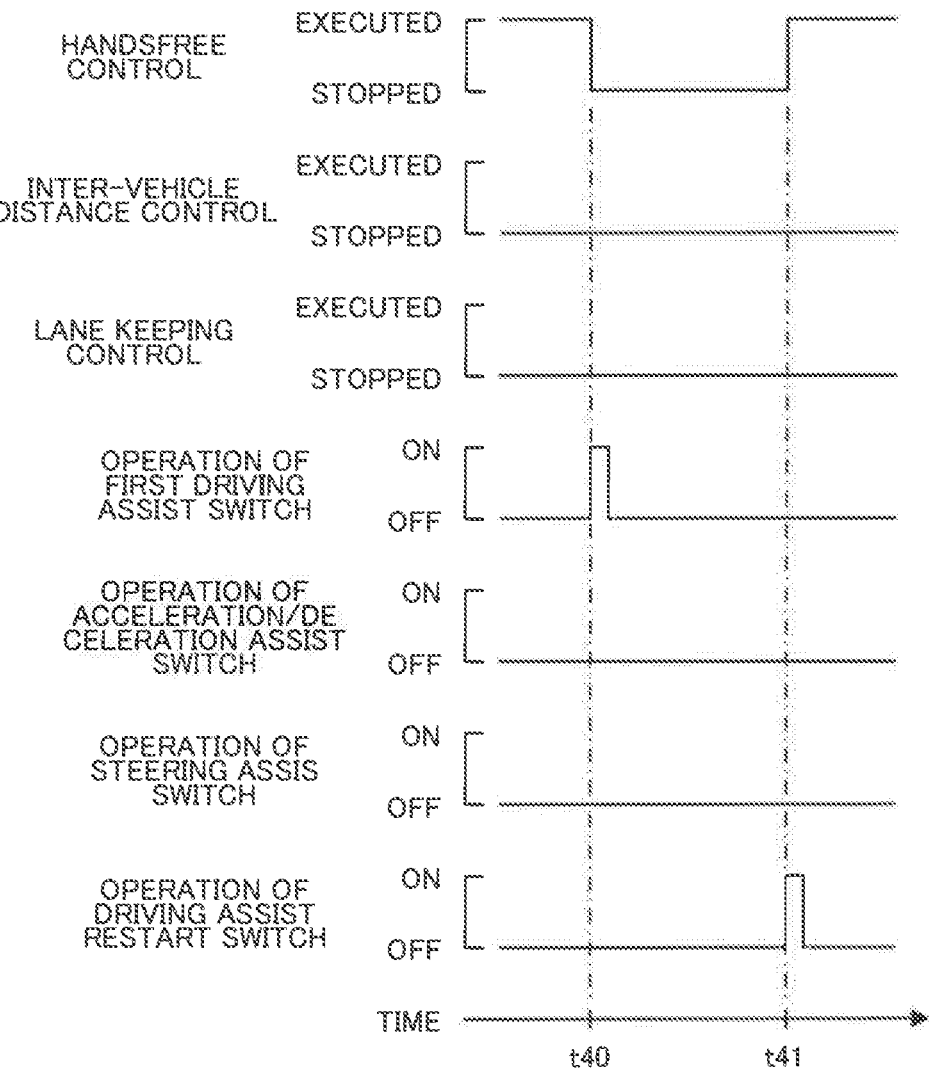
FIG. 4 is a view used for describing the operations of the vehicle driving assist apparatus when the driving assist restart switch is operated after a handsfree control is stopped.

According to the vehicle driving assist apparatus 10, as shown in FIG. 4, when (i) the handsfree control is stopped in response to the first driving assist switch 81 being operated at a timing t40, and then (ii) the driving assist restart switch 83 is operated at a timing t41, the handsfree control is restarted in response to the driving assist restart switch 83 being operated. That is, the vehicle driving assist apparatus 10 determines that the driver has an intention to desire the automatic acceleration and deceleration of the vehicle 100 and the automatic steering of the vehicle 100 when the vehicle driving assist apparatus 10 forcibly stops executing the handsfree control in response to the first driving assist switch 81 being operated. Thereafter, the vehicle driving assist apparatus 10 restarts to execute the handsfree control in response to the driving assist restart switch 83 being operated as the vehicle driving assist apparatus 10 does not execute any driving assist controls. Thereby, the driving assist controls are executed in accordance with the intention of the driver.

Figure 5:
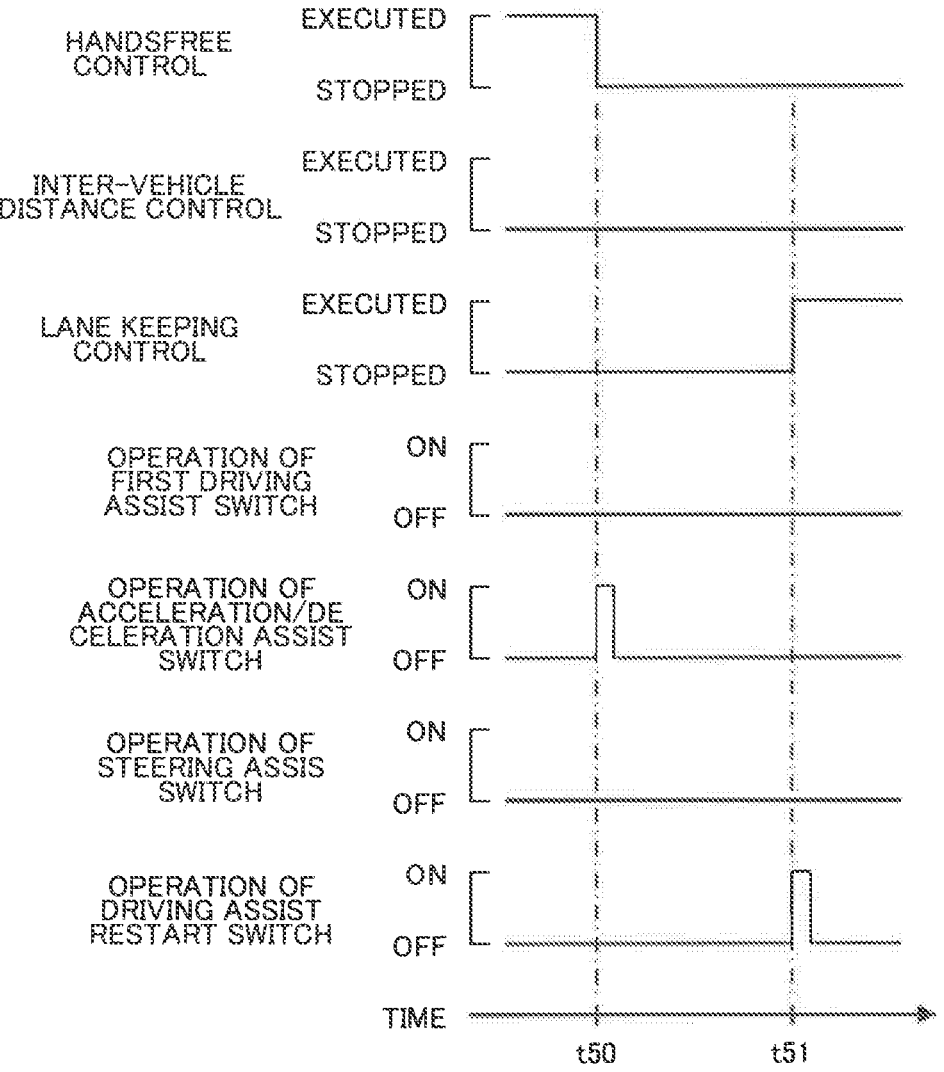
FIG. 5 is a view used for describing the operations of the vehicle driving assist apparatus when the driving assist restart switch is operated after the handsfree control is stopped.

On the other hand, as shown in FIG. 5, when (i) the handsfree control is forcibly stopped in response to the acceleration/deceleration assist switch 85 being operated at a timing t50, and then (ii) the driving assist restart switch 83 is operated at a timing t51, the handsfree control is not restarted in response to the driving assist restart switch 83 being operated, and the lane keeping control is started. That is, the vehicle driving assist apparatus 10 determines that the driver has an intention not to desire the automatic acceleration and deceleration of the vehicle 100 when the vehicle driving assist apparatus 10 forcibly stops executing the handsfree control in response to the acceleration/deceleration assist switch 85 being operated. Similarly, the vehicle driving assist apparatus 10 determines that the driver has an intention not to desire the automatic acceleration and deceleration of the vehicle 100 when the vehicle driving assist apparatus 10 forcibly stops executing the handsfree control in response to any one of the acceleration/deceleration conditions Caccel_1 and Caccel_2 becoming satisfied. Thereafter, the vehicle driving assist apparatus 10 starts to execute the lane keeping control without restarting to execute the handsfree control in response to the driving assist restart switch 83 being operated as the vehicle driving assist apparatus 10 does not execute any driving assist controls. Thereby, the driving assist controls are executed in accordance with the intention of the driver.

Figure 6:
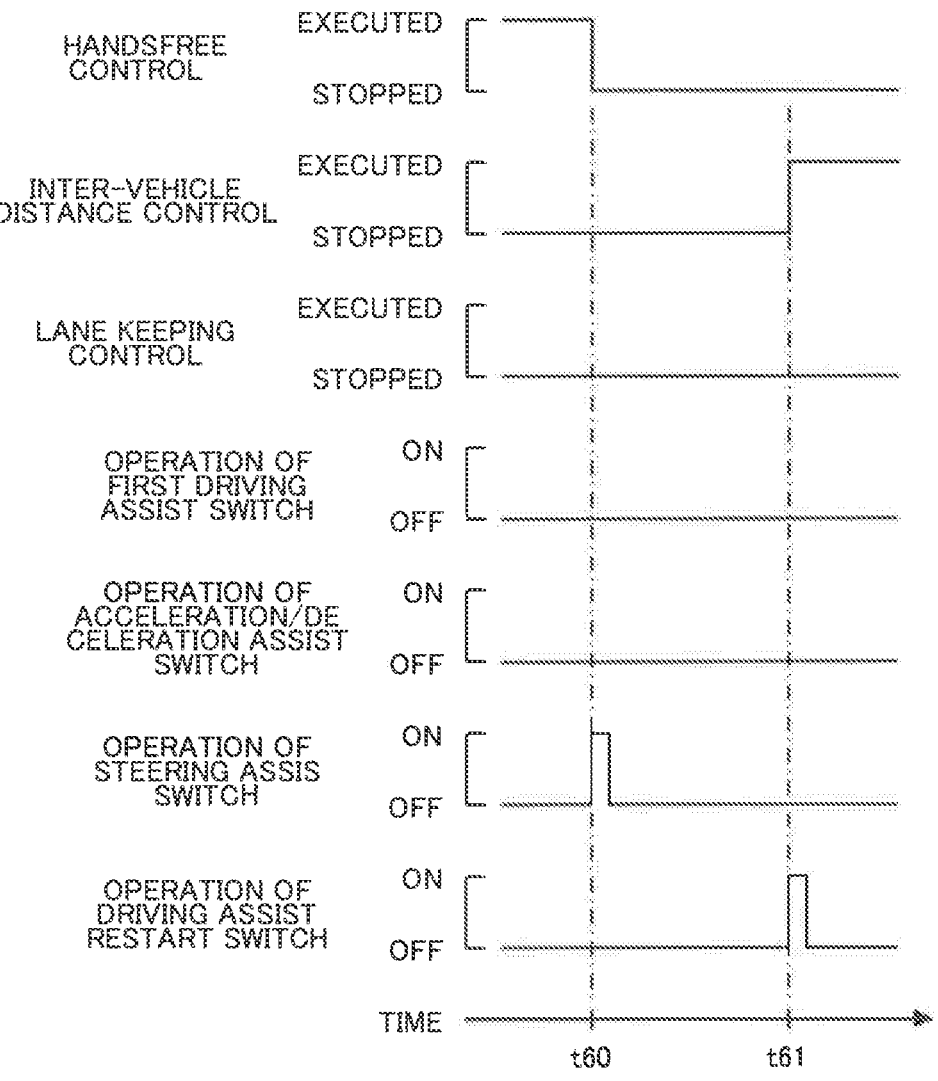
FIG. 6 is a view used for describing the operations of the vehicle driving assist apparatus when the driving assist restart switch is operated after the handsfree control is stopped.

Further, as shown in FIG. 6, when (i) the handsfree control is forcibly stopped in response to the steering assist switch 86 being operated at a timing t60, and then (ii) the driving assist restart switch 83 is operated at a timing t61, the handsfree control is not restarted, and the inter-vehicle distance control is started in response to the driving assist restart switch 83 being operated. That is, the vehicle driving assist apparatus 10 determines that the driver has an intention not to desire the automatic steering of the vehicle 100 when the vehicle driving assist apparatus 10 forcibly stops executing the handsfree control in response to the steering assist switch 86 being operated. Similarly, the vehicle driving assist apparatus 10 determines that the driver has an intention not to desire the automatic steering of the vehicle 100 when the vehicle driving assist apparatus 10 forcibly stops executing the handsfree control in response to any one of the steering conditions Cst_1 and Cst_2 becoming satisfied. Thereafter, the vehicle driving assist apparatus 10 starts to execute the inter-vehicle distance control without restarting to execute the handsfree control in response to the driving assist restart switch 83 being operated as the vehicle driving assist apparatus 10 does not execute any driving assist controls. Thereby, the driving assist controls are executed in accordance with the intention of the driver.

It should be noted that the vehicle driving assist apparatus 10 starts to execute both the inter-vehicle distance control and the lane keeping control without restarting to execute the handsfree control in response to any one of execution conditions Cboth_1 and Cboth_2 described below becoming satisfied.

(1) The execution condition Cboth_1 is a condition that (i) the driving assist restart switch 83 is operated, (ii) the handsfree control execution condition Cads_start is not satisfied, (iii) any one of the driving assist controls is not executed, (iv) the handsfree control was stopped in response to any one of the first driving assist switch 81, the second driving assist switch 82, and the cancelling switch 84 being operated.

(2) The execution condition Cboth_2 is a condition that (i) the driving assist restart switch 83 is operated, (ii) the handsfree control execution condition Cads_start is not executed, (iii) any one of the driving assist controls is not executed, and (iv) the handsfree control was stopped in response to any one of the additional conditions Cadd_1 to Cadd_6 becoming satisfied.

It should be noted that the vehicle driving assist apparatus 10 may be configured to determine that the inter-vehicle distance control changing condition Cacc_change becomes satisfied without determining that the handsfree control stop condition Cads_stop becomes satisfied when any one of the stop conditions Cads_stop_2 and Cads_stop_3 becomes satisfied.

Further, the vehicle driving assist apparatus 10 may be configured to determine that the lane keeping control changing condition Clta_change becomes satisfied without determining that the handsfree control stop condition Cads_stop becomes satisfied when any one of the stop conditions Cads_stop_4 and Cads_stop_5 becomes satisfied.

<Lane Departure Preventing Control>

The vehicle driving assist apparatus 10 may be configured to execute a lane departure preventing control. In this case, the vehicle driving assist apparatus 10 includes a switch operated by the driver to permit to execute the lane departure preventing control.

The lane departure preventing control is a control to automatically steer the vehicle 100 to prevent the vehicle 100 from departing from the traffic lane where the vehicle 100 currently moves. Therefore, the lane departure preventing control is a control to automatically steer the vehicle 100 to provide the driver with assistance to the steering of the vehicle 100. Hereinafter, the traffic lane where the vehicle 100 currently moves, will be referred to as "the current moving lane."

Further, the lane departure preventing control is a control to automatically steer the vehicle 100, but not to permit the driver to release his/her hands from the steering wheel 53. Therefore, the lane departure preventing control is the non-handsfree control not to permit the driver to release his/her hands from the steering wheel 53.

The vehicle driving assist apparatus 10 starts to execute the lane departure preventing control when (i) the driver permits to execute the lane departure preventing control, and (ii) a lane departure preventing control execution condition Clda_start becomes satisfied. The lane departure preventing control execution condition Clda_start becomes satisfied when an execution condition Clda_start_1 described below becomes satisfied.

(1) The execution condition Clda_start_1 is a condition that a time taken for the vehicle 100 to depart from the current moving lane is shorter than or equal to a threshold time. The vehicle driving assist apparatus 10 determines whether the time taken for the vehicle 100 to depart from the current moving lane is shorter than or equal to the threshold time, based on the image information Iimg, and the moving speed SPD of the vehicle 100.

Further, the vehicle driving assist apparatus 10 terminates executing the lane departure preventing control at a time when the vehicle 100 is steered by the lane departure preventing control to a position where the vehicle 100 does not depart from the current moving lane.

Further, the vehicle driving assist apparatus 10 does not execute the lane departure preventing control even if the lane departure preventing control execution condition Clda_start becomes satisfied when the driver does not permit to execute the lane departure preventing control.

Further, the vehicle driving assist apparatus 10 may be configured to determine that the driver has an intention not to desire to execute the lane departure preventing control when (i) the driver permits to execute the lane departure preventing control, and (ii) the steering assist switch 86 is operated. In this case, the vehicle driving assist apparatus 10 determines that the driver has an intention to desire to execute the lane departure preventing control when the steering assist switch 86 is operated after the vehicle driving assist apparatus 10 determines that the driver has an intention not to desire to execute the lane departure preventing control. Further, the vehicle driving assist apparatus 10 determines that the driver has an intention to desire to execute the lane departure preventing control when the steering assist switch 86 is operated even when the driver does not permit to execute the lane departure preventing control.

Further, the vehicle driving assist apparatus 10 does not execute the lane departure preventing control even when the lane departure preventing control execution condition Clda_start becomes satisfied when the vehicle driving assist apparatus 10 determines that the driver has an intention not to desire to execute the lane departure preventing control. Further, the vehicle driving assist apparatus 10 starts to execute the lane departure preventing control when the lane departure preventing control execution condition Clda_start becomes satisfied when the driver has an intention to desire to execute the lane departure preventing control.

<Specific Operations of Vehicle Driving Assist Apparatus>

Next, specific operations of the vehicle driving assist apparatus 10 will be described. The CPU of the ECU 90 of the vehicle driving assist apparatus 10 is configured or programmed to execute a routine shown in FIG. 7 each time a predetermined time elapses.

At a predetermined timing, the CPU starts a process from a step 700 and then, proceeds with the process to a step 705 to determine whether a value of a handsfree control execution flag Xads_start is "1." The value of the handsfree control execution flag Xads_start is set to "1" when the handsfree control execution condition Cads_start becomes satisfied. On the other hand, the value of the handsfree control execution flag Xads_start is set to "0" when any one of the handsfree control stop condition Cads_stop, the inter-vehicle distance control changing condition Cacc_change, and the lane keeping control changing condition Clta_change becomes satisfied.

When the CPU determines "Yes" at the step 705, the CPU proceeds with the process to a step 710 to execute the handsfree control. Next, the CPU proceeds with the process to a step 795 to terminate this routine once.

On the other hand, when the CPU determines "No" at the step 710, the CPU proceeds with the process to a step 715 to determine whether a value of an inter-vehicle distance control execution flag Xacc_start is "1." The value of the inter-vehicle distance control execution flag Xacc_start is set to "1" when the inter-vehicle distance control execution condition Cacc_start becomes satisfied. On the other hand, the value of the inter-vehicle distance control execution flag Xacc_start is set to "0" when the inter-vehicle distance control stop condition Cacc_stop becomes satisfied.

When the CPU determines "Yes" at the step 715, the CPU proceeds with the process to a step 720 to execute the inter-vehicle distance control. Next, the CPU proceeds with the process to a step 725.

On the other hand, when the CPU determines "No" at the step 715, the CPU proceeds with the process to the step 725.

When the CPU proceeds with the process to the step 725, the CPU determines whether a value of a lane keeping control execution flag Xlta_start is "1." The value of the lane keeping control execution flag Xlta_start is set to "1" when the lane keeping control execution condition Clta_start becomes satisfied. On the other hand, the value of the lane keeping control execution flag Xlta_start is set to "0" when the stop condition Clta_stop becomes satisfied.

When the CPU determines "Yes" at the step 725, the CPU proceeds with the process to a step 730 to execute the lane keeping control. Next, the CPU proceeds with the process to the step 795 to terminate this routine once.

Figure 8:
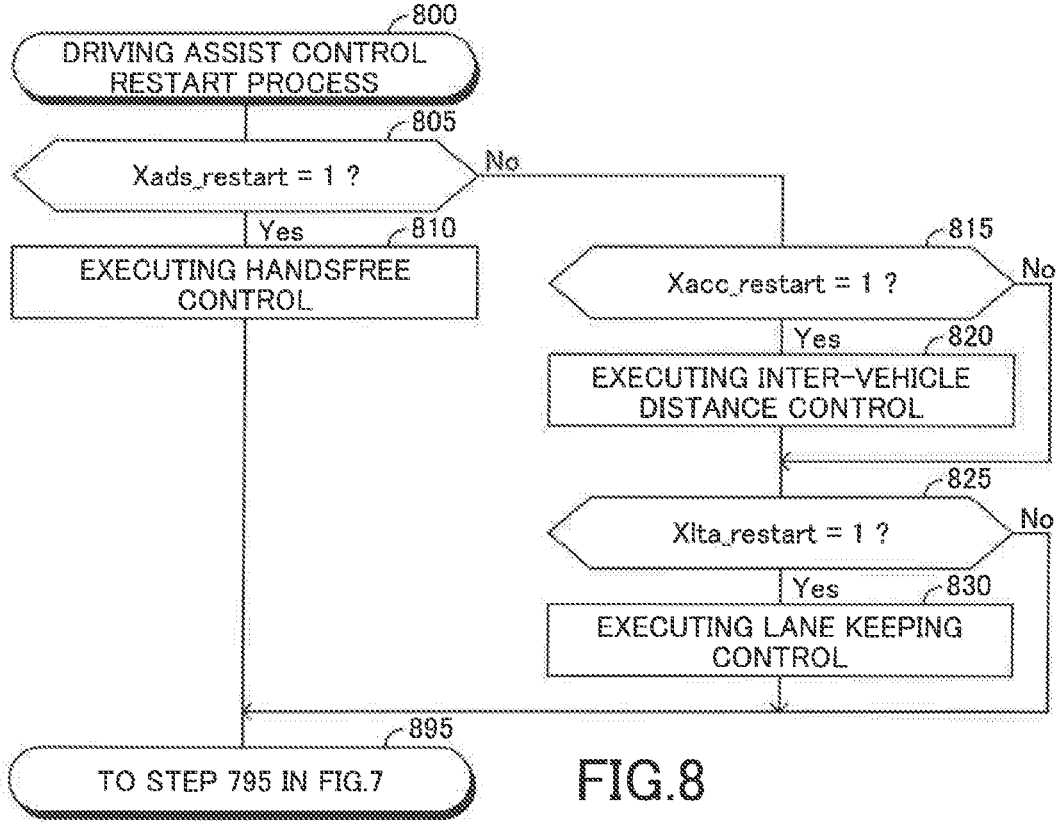
FIG. 8 is a view which shows a flowchart of a routine executed the CPU.

On the other hand, when the CPU determines "No" at the step 725, the CPU proceeds with the process to a step 735 to execute a routine shown in FIG. 8. Therefore, when the CPU proceeds with the process to the step 735, the CPU starts a process from a step 800 in FIG. 8 and then, proceeds with the process to a step 805 to determine whether a value of a handsfree control restart flag Xads_restart is "1." The value of the handsfree control restart flag Xads_restart is set to "1" when the handsfree control restart condition Cads_restart becomes satisfied. On the other hand, the value of the handsfree control restart flag Xads_restart is set to "0" when the handsfree control is stopped.

When the CPU determines "Yes" at the step 805, the CPU proceeds with the process to a step 810 to execute the handsfree control. Next, the CPU proceeds with the process to the step 795 in FIG. 7 via a step 895 to terminate this routine once.

On the other hand, when the CPU determines "No" at the step 805, the CPU proceeds with the process to a step 815 to determine whether a value of an inter-vehicle distance control restart flag Xacc_restart is "1." The value of the inter-vehicle distance control restart flag Xacc_restart is set to "1" when the inter-vehicle distance control restart condition Cacc_restart becomes satisfied. On the other hand, the value of the inter-vehicle distance control restart flag Xacc_restart is set to "0" when the inter-vehicle distance control is stopped.

When the CPU determines "Yes" at the step 815, the CPU proceeds with the process to a step 820 to execute the inter-vehicle distance control. Next, the CPU proceeds with the process to a step 825.

On the other hand, when the CPU determines "No" at the step 815, the CPU proceeds with the process to the step 825.

When the CPU proceeds with the process to the step 825, a value of a lane keeping control restart flag Xlta_restart is "1." The value of the lane keeping control restart flag Xlta_restart is set to "1" when the lane keeping control restart condition Clta_restart becomes satisfied. On the other hand, the value of the lane keeping control restart flag Xlta_restart is set to "0" when the lane keeping control is stopped.

When the CPU determines "Yes" at the step 825, the CPU proceeds with the process to a step 830 to execute the lane keeping control. Next, the CPU proceeds with the process to the step 795 in FIG. 7 via the step 895 to terminate this routine once.

Figure 7:
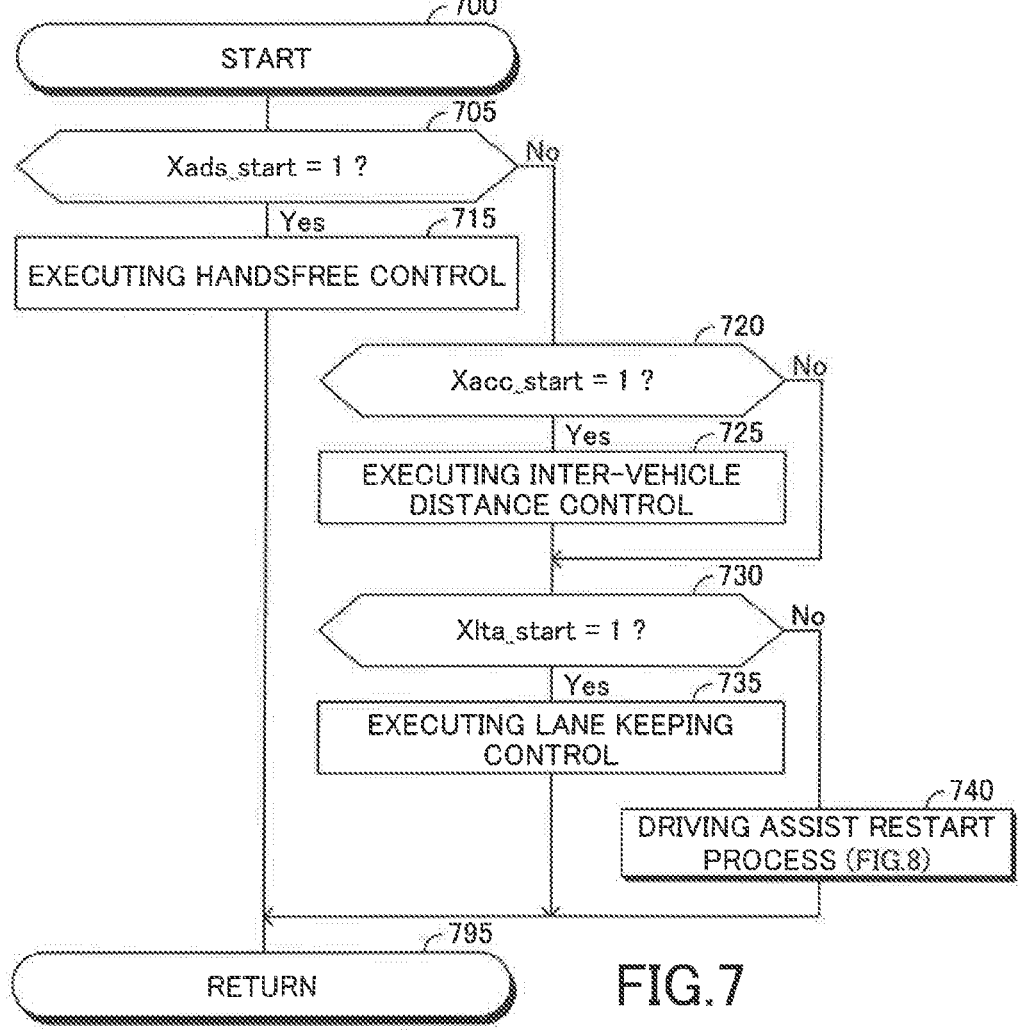
FIG. 7 is a view which shows a flowchart of a routine executed a CPU of an ECU shown in FIG. 1.

On the other hand, when the CPU determines "No" at the step 825, the CPU proceeds with the process to the step 795 in FIG. 7 via the step 895 to terminate this routine once.

Figure 9:
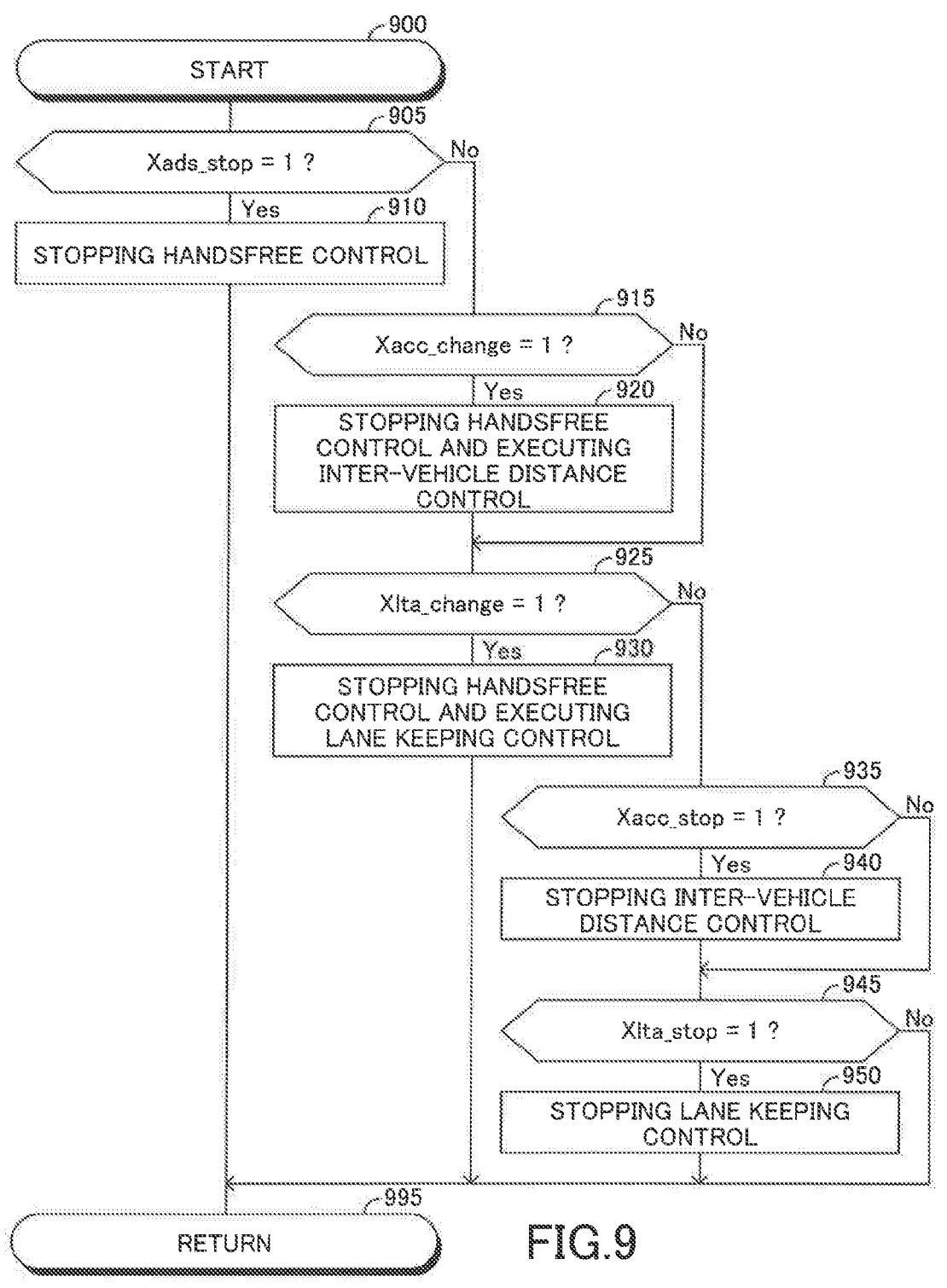
FIG. 9 is a view which shows a flowchart of a routine executed the CPU.

In addition, the CPU is configured or programmed to execute a routine shown in FIG. 9 each time the predetermined time elapses. Therefore, at a predetermined timing, the CPU starts a process from a step 900 in FIG. 9 and then, proceeds with the process to a step 905 to determine whether a value of a handsfree control stop flag Xads_stop is "1." The value of the handsfree control stop flag Xads_stop is set to "1" when the handsfree control stop condition Cads_stop becomes satisfied. On the other hand, the value of the handsfree control stop flag Xads_stop is set to "0" when the handsfree control is stopped.

When the CPU determines "Yes" at the step 905, the CPU proceeds with the process to a step 910 to stop executing the handsfree control. Next, the CPU proceeds with the process to a step 995 to terminate this routine once.

On the other hand, when the CPU determines "No" at the step 905, the CPU proceeds with the process to a step 915 to determine whether a value of an inter-vehicle distance control change flag Xacc_change is "1." The value of the inter-vehicle distance control change flag Xacc_change is set to "1" when the inter-vehicle distance control changing condition Cacc_change becomes satisfied. On the other hand, the value of the inter-vehicle distance control change flag Xacc_change is set to "0" when the inter-vehicle distance control stop condition Cacc_stop becomes satisfied.

When the CPU determines "Yes" at the step 915, the CPU proceeds with the process to a step 920 to stop executing the handsfree control and execute the inter-vehicle distance control. Next, the CPU proceeds with the process to a step 925.

On the other hand, when the CPU determines "No" at the step 915, the CPU proceeds with the process to the step 925.

When the CPU proceeds with the process to the step 925, the CPU determines whether a value of a lane keeping control change flag Xlta_change is "1." The value of the lane keeping control change flag Xlta_change is set to "1" when the lane keeping control changing condition Clta_change becomes satisfied. On the other hand, the value of the lane keeping control change flag Xlta_change is set to "0" when the stop condition Clta_stop becomes satisfied.

When the CPU determines "Yes" at the step 925, the CPU proceeds with the process to a step 930 to stop executing the handsfree control and execute the lane keeping control. Next, the CPU proceeds with the process to a step 995 to terminate this routine once.

On the other hand, when the CPU determines "No" at the step 925, the CPU proceeds with the process to a step 935 to determine whether a value of an inter-vehicle distance control stop flag Xacc_stop is "1." The value of the inter-vehicle distance control stop flag Xacc_stop is set to "1" when the inter-vehicle distance control stop condition Cacc_stop becomes satisfied. On the other hand, the value of the inter-vehicle distance control stop flag Xacc_stop is set to "0" when the inter-vehicle control is stopped.

When the CPU determines "Yes" at the step 935, the CPU proceeds with the process to a step 940 to stop executing the inter-vehicle distance control. Next, the CPU proceeds with the process to a step 945.

On the other hand, when the CPU determines "No" at the step 935, the CPU proceeds with the process to the step 945.

When the CPU proceeds with the process to the step 945, the CPU determines whether a value of a lane keeping control stop flag Xlta_stop is "1." The value of the lane keeping control stop flag Xlta_stop is set to "1" when the stop condition Clta_stop becomes satisfied. On the other hand, the value of the lane keeping control stop flag Xlta_stop is set to "0" when the lane keeping control is stopped When the CPU determines "Yes" at the step 945, the CPU proceeds with the process to a step 950 to stop executing the lane keeping control. Next, the CPU proceeds with the process to a step 995 to terminate this routine once.

On the other hand, when the CPU determines "No" at the step 945, the CPU proceeds with the process to the step 995 to terminate this routine once.

The specific operations of the vehicle driving assist apparatus 10 have been described. Thereby, when the driver presumably has an intention not to desire the automatic acceleration and deceleration of the vehicle 100 (see a determination "No" at the step 815 in FIG. 8), the inter-vehicle distance control is not restarted even when the driving assist restart switch 83 is operated after the inter-vehicle distance control was stopped. Similarly, when the driver presumably has an intention to desire the automatic steering of the vehicle 100 (see a determination "No" at the step 825 in FIG. 8), the lane keeping control is not restarted even when the driving assist restart switch 83 is operated after the lane keeping control was stopped.

Further, when the driver presumably has an intention to desire the automatic acceleration and deceleration of the vehicle 100 (see a determination "No" at the step 805 in FIG. 8), the handsfree control is not restarted even when the driving assist restart switch 83 is operated after the handsfree control was stopped. Further, when the driver presumably has an intention to desire the automatic steering of the vehicle 100 (see the determination "No" at the step 805 in FIG. 8), the handsfree control is not restarted even when the driving assist restart switch 83 is operated after the handsfree control was stopped.

Thus, according to the vehicle driving assist apparatus 10, the driving assist control can be executed in accordance with the intension of the driver.

It should be noted that the invention is not limited to the aforementioned embodiments, and various modifications can be employed within the scope of the invention.

For example, the vehicle driving assist apparatus 10 may be configured not to stop executing the inter-vehicle distance control even when any one of the first driving assist switch 81 and the second driving assist switch 82 is operated.

Similarly, the vehicle driving assist apparatus 10 may be configured not to stop executing the lane keeping control even when any one of the first driving assist switch 81 and the second driving assist switch 82 is operated.

Similarly, the vehicle driving assist apparatus 10 may be configured not to stop executing the handsfree control even when any one of the first driving assist switch 81 and the second driving assist switch 82 is operated.

What is claimed is:

1. A vehicle driving assist apparatus applied to a vehicle as an own vehicle, comprising:

an electronic control unit configured to execute both of (i) an inter-vehicle control as a driving assist control to automatically accelerate and decelerate the own vehicle and (ii) a lane keeping control as the driving assist control to automatically steer the own vehicle; and a driving assist restart switch operated by a driver of the own vehicle to restart to execute the driving assist control which the electronic control unit has stopped executing, wherein the own vehicle is provided with an acceleration operator operated by the driver to accelerate the own vehicle, a brake operator operated by the driver to brake the own vehicle, and a steering operator operated by the driver to steer the own vehicle, wherein the vehicle driving assist apparatus further comprises a cancelling switch operated by the driver and configured to stop executing the driving assist control and to restart executing the driving assist control with a single switch operation, and wherein the electronic control unit is configured:

to stop executing the inter-vehicle control in response to the driver performing an operation to the acceleration operator or the brake operator as the electronic control unit executes the inter-vehicle control;

to stop executing the lane keeping control in response to the driver performing an operation to the steering operator as the electronic control unit executes the lane keeping control;

to stop executing the inter-vehicle control in response to the driver performing an operation to the cancelling switch as the electronic control unit executes the inter-vehicle control;

to stop executing the lane keeping control in response to the driver performing the operation to the cancelling switch as the electronic control unit executes the lane keeping control;

not to restart to execute the inter-vehicle control based on a single operation of the driving assist restart switch is operated after the electronic control unit stopped executing the inter-vehicle control in response to the driver performing the operation to the acceleration operator or the brake operator;

not to restart to execute the lane keeping control based on a single operation of the driving assist restart switch is operated after the electronic control unit stopped executing the lane keeping control in response to the driver performing the operation to the steering operator;

to restart to execute the inter-vehicle control based on a single operation of the driving assist restart switch after the electronic control unit stopped executing the inter-vehicle control in response to the driver performing the operation to the cancelling switch;

to restart to execute the lane keeping control based on a single operation of the driving assist restart switch after the electronic control unit stopped executing the lane keeping control in response to the driver performing the operation to the cancelling switch;

to restore a first execution state of the lane keeping control when the driving assist restart switch is operated after the electronic control unit stopped executing a handsfree control in response to the driver performing the operation to the acceleration operator or the brake operator; and to restore a second execution state of the inter-vehicle control when the driving assist restart switch is operated after the electronic control unit stopped executing the handsfree control in response to the driver performing the operation to the steering operator.

2. The vehicle driving assist apparatus as set forth in claim 1, wherein:

the vehicle driving assist apparatus further comprises an acceleration/deceleration assist switch operated by the driver to execute and stop executing only the inter-vehicle control; and the electronic control unit is further configured:

to stop executing the inter-vehicle control in response to the driver performing an operation to the acceleration/deceleration assist switch as the electronic control unit executes the inter-vehicle control;

not to restart to execute the inter-vehicle control when the driving assist restart switch is operated after the electronic control unit stopped executing the inter-vehicle control in response to the driver performing the operation to the acceleration/deceleration assist switch; and to restore a first execution state of the lane keeping control when the driving assist restart switch is operated after the electronic control unit stopped executing a handsfree control in response to the driver performing the operation to the acceleration/deceleration assist switch.

3. The vehicle driving assist apparatus as set forth in claim 1, wherein:

the vehicle driving assist apparatus further comprises a steering assist switch operated by the driver to execute and stop executing only the lane keeping control; and the electronic control unit is further configured:

to stop executing the lane keeping control in response to the driver performing an operation to the steering assist switch as the electronic control unit executes the lane keeping control;

not to restart to execute the lane keeping control when the driving assist restart switch is operated after the electronic control unit stopped executing the lane keeping control in response to the driver performing the operation to the steering assist switch; and to restore a second execution state of the inter-vehicle control when the driving assist restart switch is operated after the electronic control unit stopped executing the handsfree control in response to the driver performing the operation to the steering assist switch.

4. The vehicle driving assist apparatus as set forth in claim 1, wherein the electronic control unit is configured:

to execute both the inter-vehicle control and the lane keeping control as the driving assist control;

to stop executing both the inter-vehicle control and the lane keeping control in response to the driver performing the operation to the acceleration operator or the brake operator as the electronic control unit executes both the inter-vehicle control and the lane keeping control;

to stop executing both the inter-vehicle control and the lane keeping control in response to the driver performing the operation to the steering operator as the electronic control unit executes both the inter-vehicle control and the lane keeping control;

to restart to execute the lane keeping control without restarting to execute the inter-vehicle control when the driving assist restart switch is operated after the electronic control unit stopped executing both the inter-vehicle control and the lane keeping control in response to the driver performing the operation to the acceleration operator or the brake operator; and to restart to execute the inter-vehicle control without restarting to execute the lane keeping control when the driving assist restart switch is operated after the electronic control unit stopped executing both the inter-vehicle control and the lane keeping control in response to the driver performing the operation to the steering operator.

5. The vehicle driving assist apparatus as set forth in claim 4, wherein the electronic control unit is configured:

to stop executing both the inter-vehicle control and the lane keeping control in response to the driver performing the operation to the cancelling switch as the electronic control unit executes both the inter-vehicle control and the lane keeping control;

to stop executing both the inter-vehicle control and the lane keeping control in response to the driver performing the operation to the cancelling switch as the electronic control unit executes both the inter-vehicle control and the lane keeping control;

to restart to execute both the inter-vehicle control and the lane keeping control when the driving assist restart switch is operated after the electronic control unit stopped executing both the inter-vehicle control and the lane keeping control in response to the driver performing the operation to the cancelling switch; and to restart to execute both the inter-vehicle control and the lane keeping control when the driving assist restart switch is operated after the electronic control unit stopped executing both the inter-vehicle control and the lane keeping control in response to the driver performing the operation to the cancelling switch.

6. The vehicle driving assist apparatus as set forth in claim 4, wherein:

the vehicle driving assist apparatus further comprises a driving assist switch operated by the driver to stop executing the driving assist control;

the operation to the cancelling switch comprising an operation performed by the driver to the driving assist switch as the electronic control unit executes the inter-vehicle control; and the operation to the cancelling switch comprising an operation performed by the driver to the driving assist switch as the electronic control unit executes the lane keeping control.

7. The vehicle driving assist apparatus as set forth in claim 1, wherein the electronic control unit is further configured:

to execute the handsfree control as the driving assist control including (i) the inter-vehicle control and (ii) the lane keeping control and permitting the driver to release his/her hands from the steering operator operated by the driver to steer the own vehicle;

to stop executing the handsfree control in response to the driver performing the operation to the acceleration operator or the brake operator as the electronic control unit executes the handsfree control;

to stop executing the handsfree control in response to the driver performing the operation to the steering operator as the electronic control unit executes the handsfree control;

not to restart to execute the handsfree control even when the driving assist restart switch is operated after the electronic control unit stopped executing the handsfree control in response to the driver performing the operation to the acceleration operator or the brake operator; and not to restart to execute the handsfree control even when the driving assist restart switch is operated after the electronic control unit stopped executing the handsfree control in response to the driver performing the operation to the steering operator.

8. The vehicle driving assist apparatus as set forth in claim 7, wherein the electronic control unit is further configured:

to execute the lane keeping control without restarting to execute the handsfree control when the driving assist restart switch is operated after the electronic control unit stopped executing the handsfree control in response to the driver performing the operation to the acceleration operator or the brake operator; and to execute the inter-vehicle control without restarting to execute the handsfree control when the driving assist restart switch is operated after the electronic control unit stopped executing the handsfree control in response to the driver performing the operation to the steering operator.

9. The vehicle driving assist apparatus as set forth in claim 7, wherein the electronic control unit is configured:

to stop executing the inter-vehicle control of a non-handsfree control in response to the driver performing the operation to the acceleration operator or the brake operator as the electronic control unit executes the inter-vehicle control of the non-handsfree control, the non-handsfree control being a control which does not permit the driver to release his/her hands from the steering operator operated by the driver to steer the own vehicle;

to stop executing the lane keeping control of the non-handsfree control in response to the driver performing the operation to the steering operator as the electronic control unit executes the lane keeping control of the non-handsfree control;

to stop executing the inter-vehicle control of the non-handsfree control in response to the driver performing the operation to the cancelling switch as the electronic control unit executes the inter-vehicle control of the non-handsfree control;

to stop executing the lane keeping control of the non-handsfree control in response to the driver performing the operation to the cancelling switch as the electronic control unit executes the lane keeping control of the non-handsfree control;

not to restart to execute the inter-vehicle control of the non-handsfree control when the driving assist restart switch is operated after the electronic control unit stopped executing the inter-vehicle control of the non-handsfree control in response to the driver performing the operation to the acceleration operator or the brake operator;

not to restart to execute the lane keeping control of the non-handsfree control when the driving assist restart switch is operated after the electronic control unit stopped executing the lane keeping control of the handsfree control in response to the driver performing the operation to the steering operator;

to restart to execute the inter-vehicle control of the non-handsfree control when the driving assist restart switch is operated after the electronic control unit stopped executing the inter-vehicle control of the non-handsfree control in response to the driver performing the operation to the cancelling switch; and to restart to execute the lane keeping control of the non-handsfree control when the driving assist restart switch is operated after the electronic control unit stopped executing the lane keeping control of the non-handsfree control in response to the driver performing the operation to the cancelling switch.

* * * * *